US006577438B2

United States Patent
Sugawara et al.

(10) Patent No.: US 6,577,438 B2
(45) Date of Patent: Jun. 10, 2003

(54) METHOD AND APPARATUS FOR MONITORING AND CONTROLLING GAIN TILT IN AN OPTICAL AMPLIFIER

(75) Inventors: Toshiki Sugawara, Koganei (JP); Junya Kosaka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/938,610

(22) Filed: Aug. 27, 2001

(65) Prior Publication Data

US 2002/0141044 A1 Oct. 3, 2002

(30) Foreign Application Priority Data

Feb. 20, 2001 (JP) ......................................... 2001-043075

(51) Int. Cl.[7] .............................................. H04B 10/12
(52) U.S. Cl. ............. 359/337.11; 359/337; 359/341.42; 359/341.4
(58) Field of Search ......................... 359/337.11, 337.1, 359/341.4, 177, 341.42

(56) References Cited

U.S. PATENT DOCUMENTS

| | | | | |
|---|---|---|---|---|
| 5,909,305 A | * | 6/1999 | Kinoshita ................. | 359/337.1 |
| 6,061,171 A | * | 5/2000 | Taylor et al. ............. | 359/337.1 |
| 6,088,152 A | * | 7/2000 | Berger et al. ............. | 359/334 |
| 6,246,511 B1 | * | 6/2001 | Jameson ..................... | 359/337 |
| 6,320,693 B1 | * | 11/2001 | Cereo et al. .............. | 359/337 |
| 6,344,922 B1 | * | 2/2002 | Grubb et al. .............. | 359/334 |
| 6,388,804 B1 | * | 5/2002 | Sugawara .............. | 359/337.11 |
| 6,424,457 B1 | * | 7/2002 | Koonmen et al. ........ | 359/337.1 |
| 6,452,715 B1 | * | 9/2002 | Friedrich .................... | 359/334 |
| 2001/0050802 A1 | * | 12/2001 | Namiki et al. ......... | 359/337.11 |

FOREIGN PATENT DOCUMENTS

| | | | |
|---|---|---|---|
| JP | 10-173266 | * | 6/1998 |
| JP | 10-303821 | * | 11/1998 |

OTHER PUBLICATIONS

Di Muro et al. "Er3+ doped fibre amplifier temperautre characteristics in extended and conventional band regions with gain control compensation." Optical Amplifiers and Their Applications 2000, Jul. 2000, pp. 72–74.*

Kakui et al. "Dynamic–gain–tilt–free long–wavelength band Erbium doped fiber amplifiers utilizing temperature dependent characteristics of gain spectrum." OFCC 2000, vol. 2, Mar. 2000, pp. 6–8.*

* cited by examiner

Primary Examiner—Thomas G. Black
Assistant Examiner—Andrew R Sommer
(74) Attorney, Agent, or Firm—Antonelli, Terry, Stout & Kraus, LLP

(57) ABSTRACT

An optical amplifier includes an optical amplification medium which has simultaneous inputs of a WDM signal light and a pumping light and amplifies the WDM signal light, a pumping light source, and an amplification characteristic supervisor part which evaluates the gain tilt of amplified WDM signal lights. The supervisor part is provided in advance with a record of the relation between the medium output light power and the pumping light power corresponding to the output light power in terms of a number of proper curves plotted for certain gain tilts, and adapted to select a proper curve which is nearest to the relation in operation between the power of the pumping light which is incident to the medium in operation and the resulting amplified output light power from among the recorded proper curves, thereby determining the gain tilt of the medium based on the selected proper curve.

18 Claims, 21 Drawing Sheets

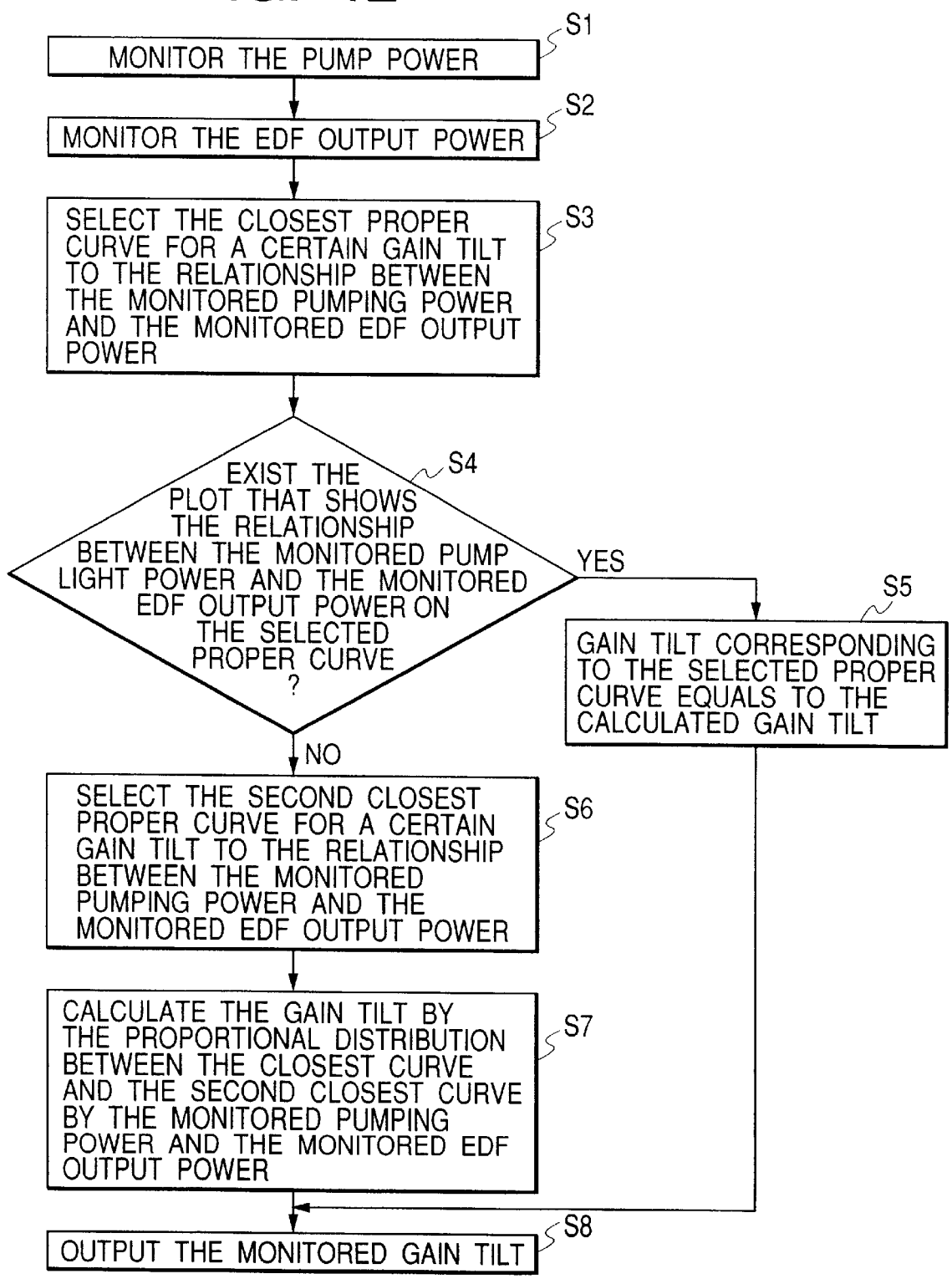

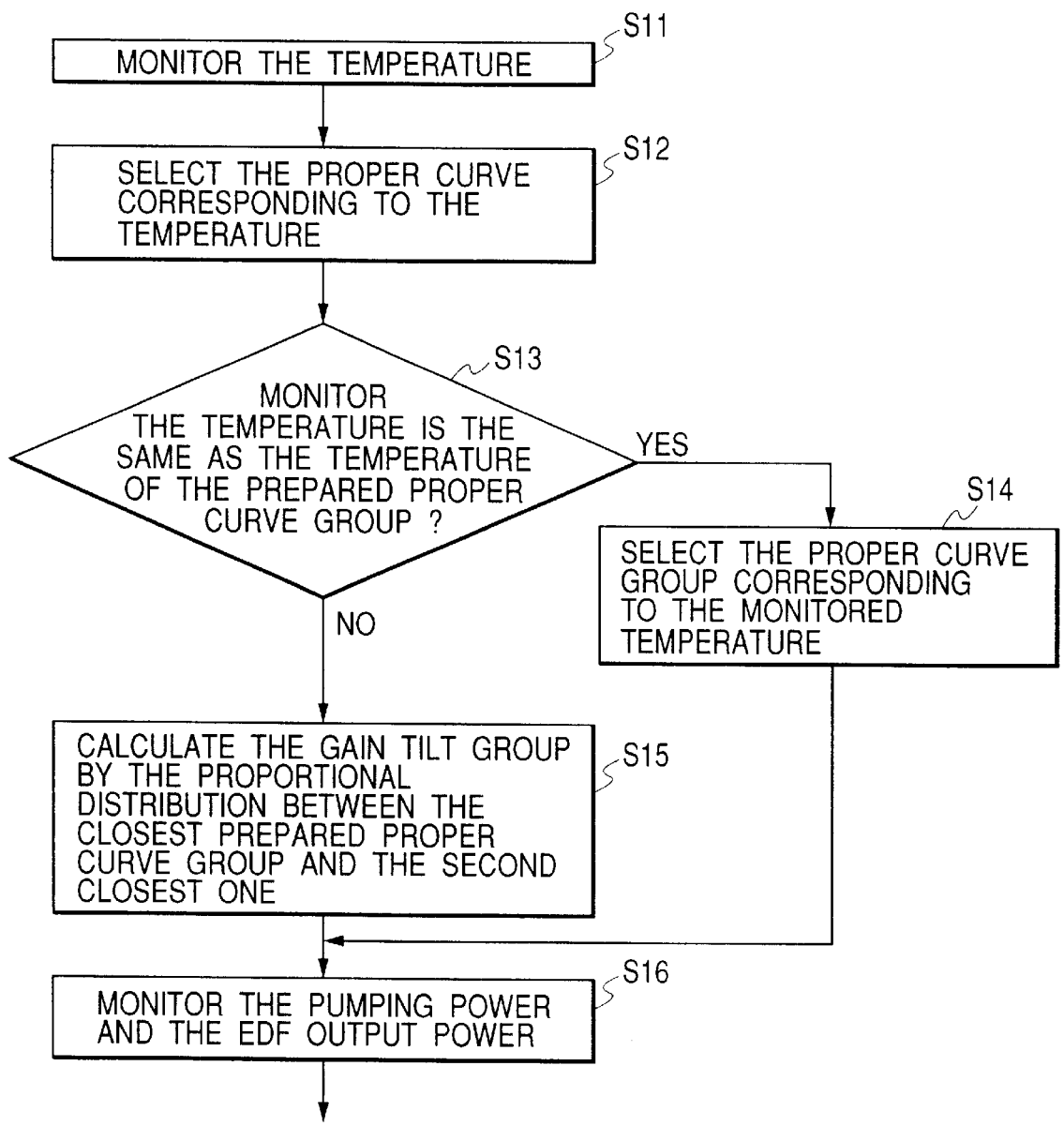

METHOD AND APPARATUS FOR MONITORING AND CONTROLLING GAIN TILT IN AN OPTICAL AMPLIFIER

BACKGROUND OF THE INVENTION

The present invention relates to an optical amplifier used for optical communication systems, and particularly to an optical amplifier used suitably for systems which adopt the optical transmission scheme based on wavelength division multiplexing.

Recently, optical transmission systems which use optical amplifiers as repeaters are studied and put into practice vigorously. It is particularly beneficial for the multi-media service industry typified by the Internet to increase the band width and communication capacity based on the WDM (Wavelength Division Multiplex) technology for multiplexing signal lights of different wavelengths. In the optical communication system using the WDM technique, the optical repeater which amplifies all signal lights at once has an extremely crucial role for the extension of transmission distance.

For the optical amplification medium which forms the optical amplifier, optical fiber, with rare earth being doped thereto, is useful, and it is under study and about to be put into practice. Particularly, erbium-doped fiber (EDF), which is active for amplification in a wide range of wavelength in which the loss of optical fiber is small, is used extensively in optical fiber communication systems.

In order for the optical amplification medium to be active for amplification in the band of signal light wavelengths, a pumping light which is shorter in wavelength than the signal light is put together with the signal light into the medium. The optical amplification medium has at its end the connection of a WDM optical coupler so that the signal light and pumping light are incident efficiently to the medium.

In case that a number of optical amplifiers are used as repeaters in an optical fiber communication system, it is desirable from the viewpoint of transmission design to have a constant output light power of the signal light immediately after each optical amplifier. The simplest known technique is automatic level control (ALC), which measures the total output light power of WDM signal light of the optical amplification medium and adjusts the pumping light power so that the measured power is constant.

However, the rare-earth-doped optical fiber is narrow in its gain flatness region against signal wavelengths in amplifying the signal lights at once, and even with the imposition of limitation of the wavelength range, the gain flatness against signal wavelengths is deteriorated by the variation of input signal light power.

As a scheme of overcoming this problem, there is known a technique for suppressing the wavelength dependency of the gain at different input light power levels, in which the input light power and output light power of the optical amplification medium are measured and the pumping light power is adjusted based on automatic gain control (AGC) so that the average gain evaluated from the measured light power levels is constant. The optical amplifier based on this scheme further adopts constant output control by use of a variable optical attenuator.

However, the actual optical amplifier has its gain characteristics varied by the temperature variation in addition to the variation of input light power. Therefore, an optical amplifier, which is designed to have a minimal gain's wavelength dependency at a certain temperature, cannot be rid of the wavelength dependency based solely on the AGC due to the variation of operating temperature.

Namely, the actual optical amplifier has its gain characteristics varied in response to the variation of input light power and temperature, and therefore it is necessary to provide an additional function of suppressing the wavelength dependency by monitoring the gain or output light power of each signal light.

With the intention of solving this problem, there are known several techniques for flattening the gain of optical amplifier throughout the wavelengths. For example, a control technique disclosed in Japanese Patent Laid-open (kokai) No. Hei 10-303821 is designed to separate the wavelength-multiplexed signal lights by using an array waveguide grating (AWG) and monitor the power of individual signal lights with arrayed photodiodes. Another control technique disclosed in Japanese Patent Laid-open (Kokai) No. Hei 10-173266 is designed to separate part of the output light of optical amplification medium and monitor the power of each signal light based on scanning with a variable wavelength band-pass filter thereby to compensate the gain's wavelength dependency.

However, the AWG and variable wavelength band-pass filter for separating the wavelength-multiplexed signal lights are expensive optical parts, and therefore the optical amplifier using any of these parts is inevitably expensive.

SUMMARY OF THE INVENTION

With the intention of overcoming the above-mentioned prior art problem, a first object of the present invention is to provide a simple optical amplifier and an optical amplification method capable of evaluating the gain characteristics in the presence of the variation of input light power and temperature.

A second object of the present invention is to provide an optical amplifier and an optical amplification method capable of attaining the intended gain tilt based on the evaluated gain tilt.

The inventors of the present invention have conducted experiments on rare-earth-doped fiber, and found that the output light power to pumping light power relation plotted as proper curves for various input light power levels and temperatures, with the gain's wavelength dependency being kept constant, i.e., the gain tilt is constant throughout the wavelengths, are simple increase functions or linear functions.

Accordingly, by recording proper curves for several gain tilts in advance, and, in operation of the optical amplifier, selecting a proper curve on which the measured output light power to pumping light power relation exists, it is possible to determine the gain tilt corresponding to the selected proper curve as the gain tilt of the optical amplifier in operation. If there is no proper curve on which the output light power to pumping light power relation exists, the proper curve on which the relation nearest the output light power to the pumping light power relation exists is selected, and the gain tilt corresponding to selected characteristic curve is adopted as the gain tilt of the optical amplifier.

For more accurate determination of gain tilt in the absence of the exact characteristic curve, a first proper curve on which the relation nearest the output light power to pumping light power relation exists and a second proper curve on which the relation next nearest the output light power to pumping light power relation exists are selected and a third proper curve located between the first and second proper curves is set based on the interpolation, and the gain tilt corresponding to the third proper curve is determined as the gain tilt of the optical amplifier.

Among the affairs of the present invention disclosed in this specification, representatives are summarized as follows.

(1) An optical amplifier comprises an optical amplification medium which has simultaneous inputs of a WDM signal light and a pumping light and amplifies the signal light, a light source which generates the pumping light, and an amplification characteristic supervisor part which evaluates the gain tilt of amplified signal lights of different wavelengths which form the WDM signal light. The amplification characteristic supervisor part is provided in advance with a record of a plurality of proper curves formed by plotting, for certain gain tilts, the relation between the optical amplification medium output light power and the pumping light power corresponding to the output light power. And, the amplification supervisor part selects, from among the recorded proper curves, a proper curve A which is nearest to the relation in operation of the power of the pumping light which is incident to the optical amplification medium in operation and the resulting amplified output light power, thereby determining the gain tilt of the optical amplification medium based on the selected proper curve A.

(2) More preferably, if the relation in operation exists just on the proper curve A, the amplification characteristic supervisor part determines the gain tilt of the proper curve A to be the gain tilt of the optical amplification medium, or otherwise if the relation in operation exists out of the proper curve A, it selects another proper curve B which is next nearest to the relation in operation and sets a proper curve C located between the proper curves A and B based on the interpolation, thereby determining the gain tilt corresponding to the proper curve C as the gain tilt of the optical amplification medium.

(3) An optical amplifier comprises an optical amplification medium which has simultaneous inputs of a WDM signal light and a pumping light and amplifies the signal light, a light source which generates the pumping light, an amplification characteristic supervisor part which evaluates the gain tilt of amplified signal lights of different wavelengths which form the WDM signal light, and a compensation part of amplification characteristic which controls the gains of individual wavelengths by using the difference between an intended gain tilt and the gain tilt evaluated by the amplification characteristic supervisor part so that the optical amplifier output light has the intended gain tilt. The amplification characteristic supervisor part is provided in advance with a record of a plurality of proper curves formed by-plotting, for certain gain tilts, the relation between the optical amplification medium output light power and the pumping light power corresponding to the output light power. And, the amplification supervisor part selects, from among the recorded proper curves, a proper curve A which is nearest to the relation in operation of the power of the pumping light which is incident to the optical amplification medium in operation and the resulting amplified output light power exists, thereby determining the gain tilt of the optical amplification medium based on the selected proper curve A.

The optical amplifiers of items (1) and (2) may have their several proper curves recorded in the form of characteristic data tables in a semiconductor ROM (read only memory), and their selection of proper curve A and following determination of gain tilt accomplished by an ordinary semiconductor processor, instead of needing expensive optical parts. Consequently, the gain characteristics (gain tilt) in the presence of the variation of input light power and temperature can be evaluated by a simple arrangement without using expensive component parts, and the first object of the present invention is attained.

The optical amplifier of item (3) can get the gain tilt of the optical amplifier in operation to evaluate the difference between the intended gain tilt and the gain tilt of the optical amplifier in operation, and uses their difference for controlling the gain tilt as intended, and the second object of the present invention is attained.

These and other objects and many of the attendant advantages of the invention will be readily appreciated as the same becomes better understood by reference to the following detailed description when considered in connection with the accompanying drawings.

BRIEF DESCRIPTION OF THE DRAWINGS

FIG. 12 is a flowchart used to explain a manner of monitoring the gain tilt by use of characteristics data tables;

FIG. 13 is a flowchart used to explain a manner of monitoring the gain tilt by additional use of temperature-dependent modification;

DESCRIPTION OF THE PREFERRED EMBODIMENTS

The embodiments of the optical amplifier based on this invention will be explained in detail. First, the property of rare-earth-doped fiber will be explained in connection with FIG. 1.

Figure 1:
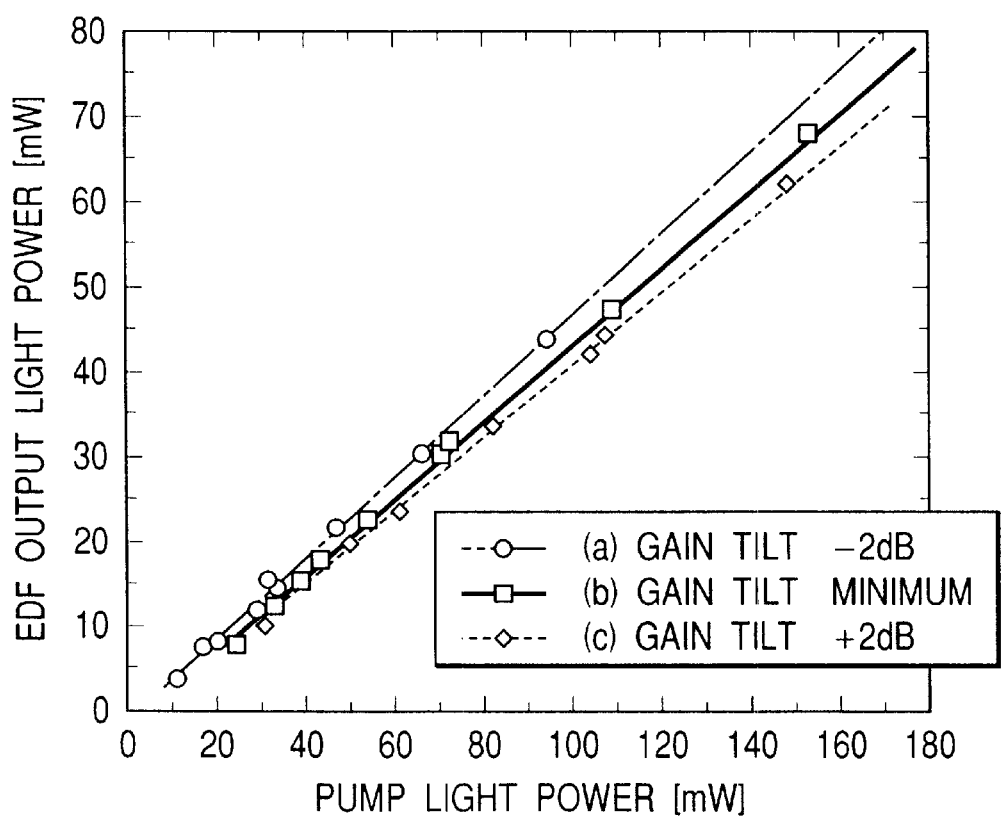
FIG. 1 is a first graph used to explain the property of rare-earth-doped fiber revealed by the present invention.

FIG. 1 is a graph on which the output light power is plotted on the vertical axis against the pumping light power (backward pumping power) on the horizontal axis based on experimental data collected for various input light power levels and temperatures with pumping conditions of the minimum gain tilt and certain constant gain tilts.

Rare-earth-doped fiber used in the experiment was EDF (erbium-doped fiber). The EDF had an erbium concentration of 400 ppm, and had an additional substance of $Al_2O_3$ at a concentration of 11000 ppm. The EDF had a length of 250 m. The EDF was connected on both sides through WDM optical couplers with semiconductor laser diodes for pumping (will be called "pumping LDs") so that it is pumped in two directions. The EDF has its temperature varied by being accommodated in a thermal chamber.

An 8-channel input signal light including eight signal lights having wavelengths of 1576.20, 1579.52, 1582.85, 1586.20, 1589.57, 1592.95, 1596.34, and 1599.75 nm was used. The input signal power level was set to −22, −19 and −16 dBm/ch and the EDF temperature was set to 0, 25 and 70° C. for each power level to establish a total of nine conditions, and the EDF output light power which is the summed light power of all channels and the pumping light power were measured in each condition.

In measuring the pumping light power, the output current of the photodiode which is built in the pumping laser diode module was monitored and converted into the pumping light power in accordance with the prepared calibration table. For the measurement of EDF output, part (of 10%) of light power was separated with a 90:10 optical tap coupler and thereafter measured with a photodiode.

In the actual measurement, it is necessary to consider the temperature dependency of the light power measuring photodiode and the coupling efficiency from the pumping light LD to the fiber.

Figure 2:
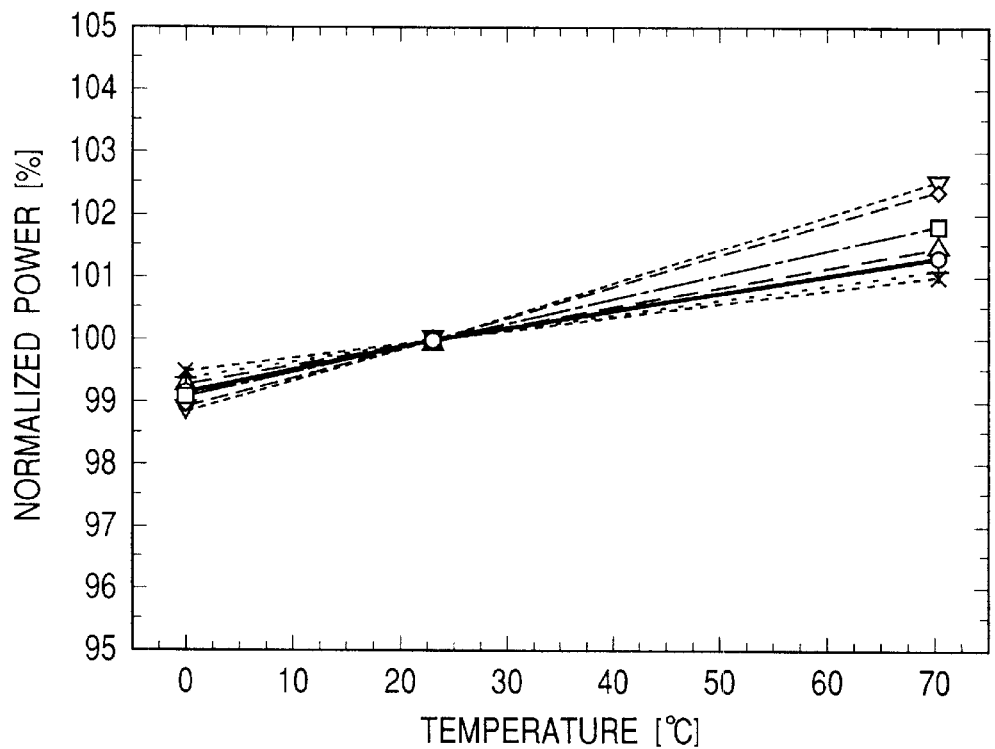
FIG. 2 is a graph used to explain the temperature dependency of the output current of a photodiode.
Figure 3:
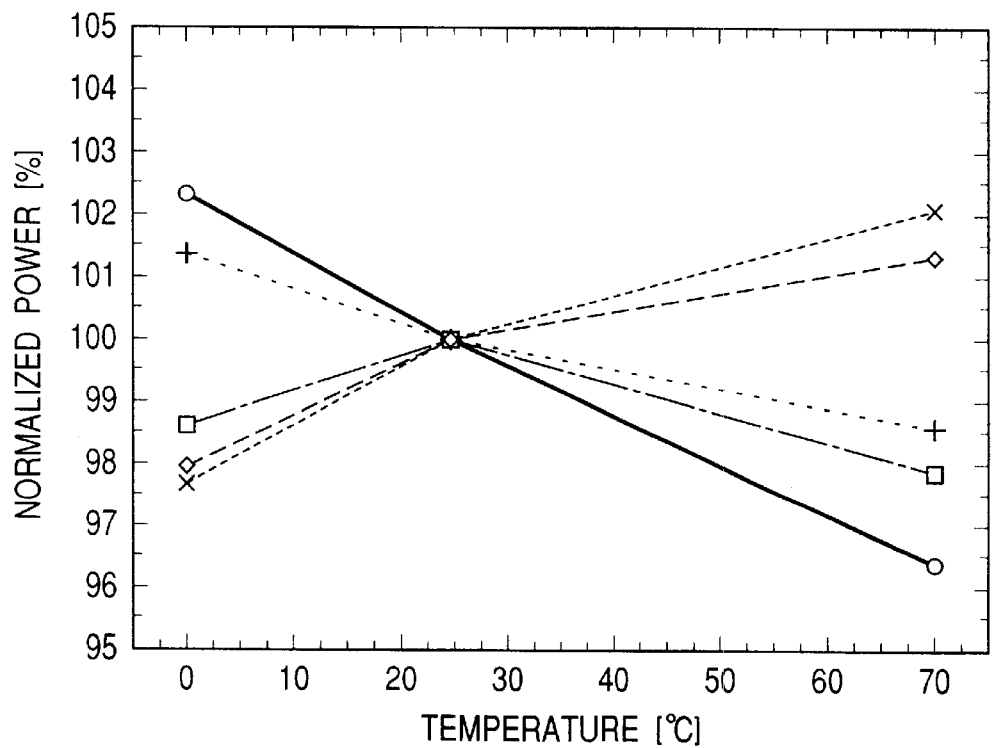
FIG. 3 is a graph used to explain the temperature dependency of the output current of a monitoring photodiode built in a pumping laser diode and the actual output light power.

FIG. 2 shows the temperature dependency of the photodiode, and FIG. 3 shows the temperature dependency of the output current of the photodiode built in the pumping light LD and the actual light power to the fiber. Both graphs show the measurement results for several samples normalized with respect to the measured values at 25° C. which are set to 100%.

FIG. 2 and FIG. 3 reveal the disparity of temperature dependency among individual photodiodes and pumping light LDs. The graph of FIG. 1 was plotted for a sample selected out of these samples and based on the experiment in consideration of the temperature dependency of the photodiode and the coupling efficiency of pumping light LD.

Figure 4:
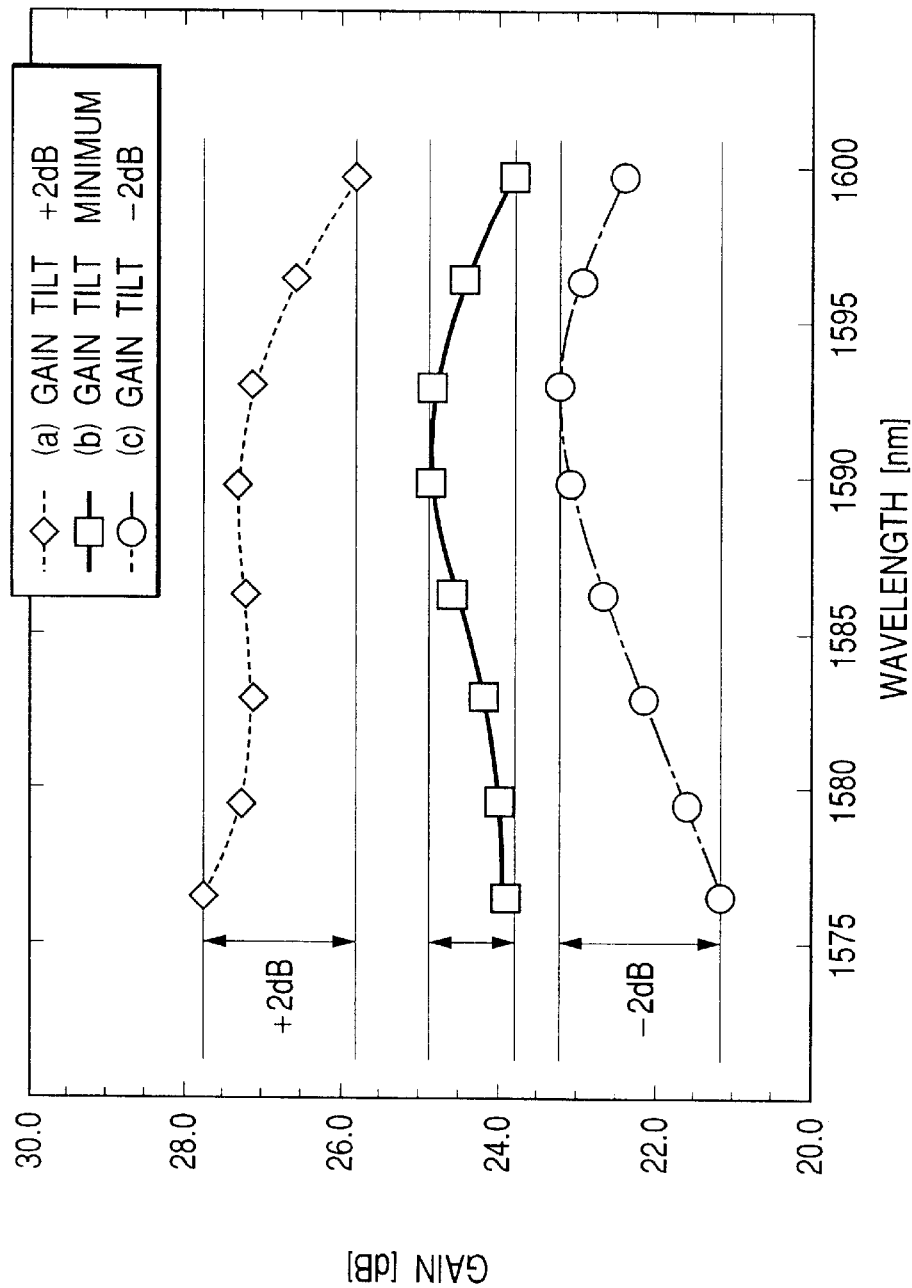
FIG. 4 is a second graph used to explain the property of rare-earth-doped fiber revealed by the present invention.

At the measurement of the pumping light power and EDF output light power, the pumping laser power was adjusted so that the amplified signal output level has the gain tilts as shown in FIG. 4, while monitoring the EDF output spectrum constantly with a spectral analyzer. The gain tilt is defined here to be the difference between the maximum signal light gain and the minimum signal light gain among different gain values resulting from different wavelengths of the amplified WDM signal light, with a positive (+) sign being appended when the signal gain is larger in a shorter wavelength than in a longer wavelength or a negative (−) sign being appended when the signal gain is smaller in a shorter wavelength than in a longer wavelength.

FIG. 4 shows a specific example of the measurement result at an EDF input light power level of −19 dBm/ch and temperature of 25° C. and at three different EDF pumping conditions, exhibiting the gain's wavelength dependency. The first EDF pumping condition is a gain tilt of +2 dB, i.e., the signal gain is maximum at the shortest wavelength 1576.20 nm and it is minimum at the longest wavelength 1599.75 nm (indicated by (a) in FIG. 4). The second EDF pumping condition is the minimal gain tilt, i.e., the signal gain at the shortest wavelength 1576.20 nm is larger than that at the longest wavelength 1599.75 nm and smaller than the peak emerging at a wavelength around 1590–1595 nm (indicated by (b) in FIG. 4). The third EDF pumping condition is a gain tilt of −2 dB, i.e., the signal gain is minimum at the shortest wavelength 1576.20 nm and it has a difference of 2 dB from the peak emerging at a wavelength around 1590–1595 nm (indicated by (c) in FIG. 4). As the pumping power is increased, while the temperature and input light power are retained constant, the temperature dependency changes from (c) to (b) and to (a) in FIG. 4.

In plotting the graph of FIG. 1, the intended pumping states were achieved by operating the forward pumping LD (the pumping light has the same direction as the signal light) at a constant pumping light power (167 mW) and adjusting the pumping light of the backward pumping LD.

The graph reveals that each train of plots under condition of a constant gain tilt virtually approximates to a linear function. Each straight line drawn on the graph is obtained based on the least square method from the plotted points, and the above-mentioned proper curves are represented by plotting the pumping light power to EDF output light power relation. The plotted points were studied as follows.

Figure 5:
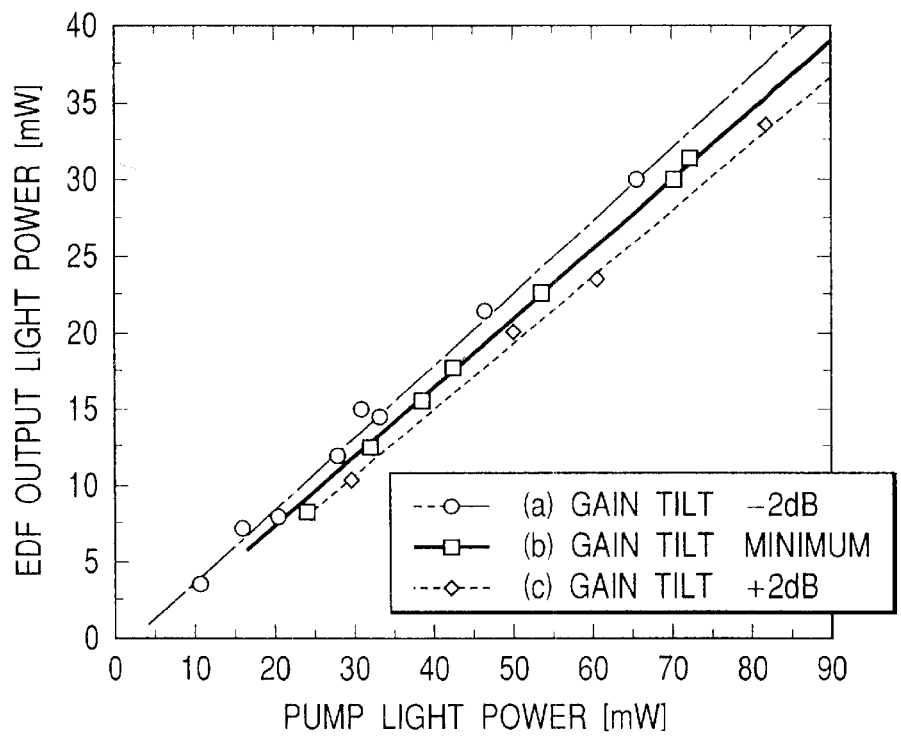
FIG. 5 is a third graph used to explain the property of rare-earth-doped fiber revealed by the present invention.

FIG. 5 is an enlarged version of part of the graph of FIG. 1 in its 0–90 mW range of the pumping light power. The graph reveals that the pumping light power to EDF output power relation is virtually on a straight line in the condition of minimum gain tilt, whereas the relation departs from a straight line in other condition particularly at a gain tilt of −2 dB.

Figure 6:
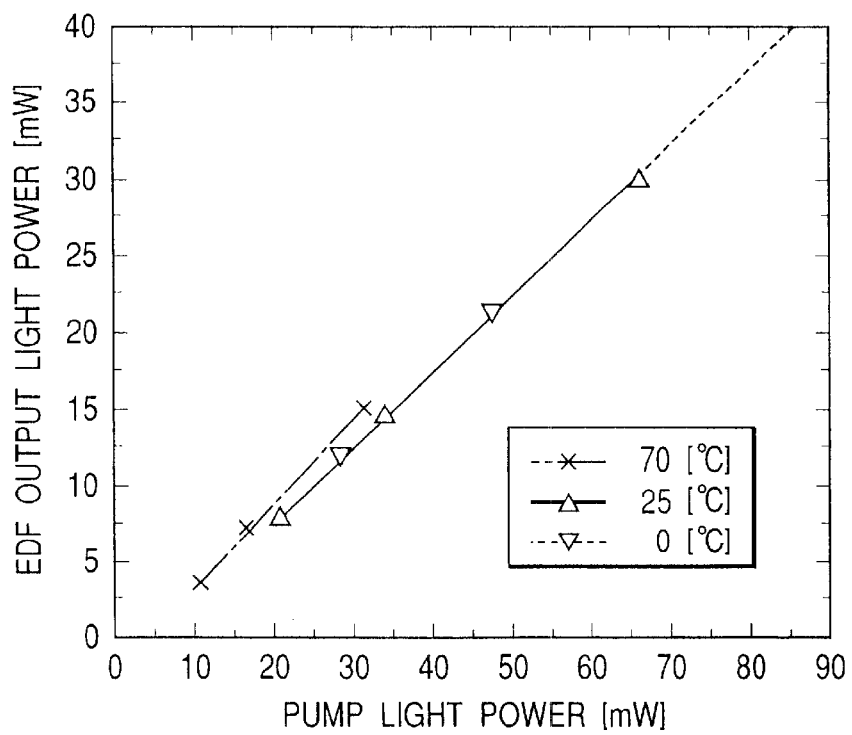
FIG. 6 is a fourth graph used to explain the property of rare-earth-doped fiber revealed by the present invention.

FIG. 6 is a graph which is extracted from FIG. 5 for the condition of −2 dB gain tilt and plotted by different marks for different temperatures. Each straight line drawn on the graph is the linear approximation of the plots based on the least square method. Accordingly, a proper curve can be approximated more accurately by straight lines in consideration of the temperature dependency.

Next, an easy manner of monitoring the EDF gain tilt by utilization of the foregoing EDF characteristics will be explained.

Figure 7:
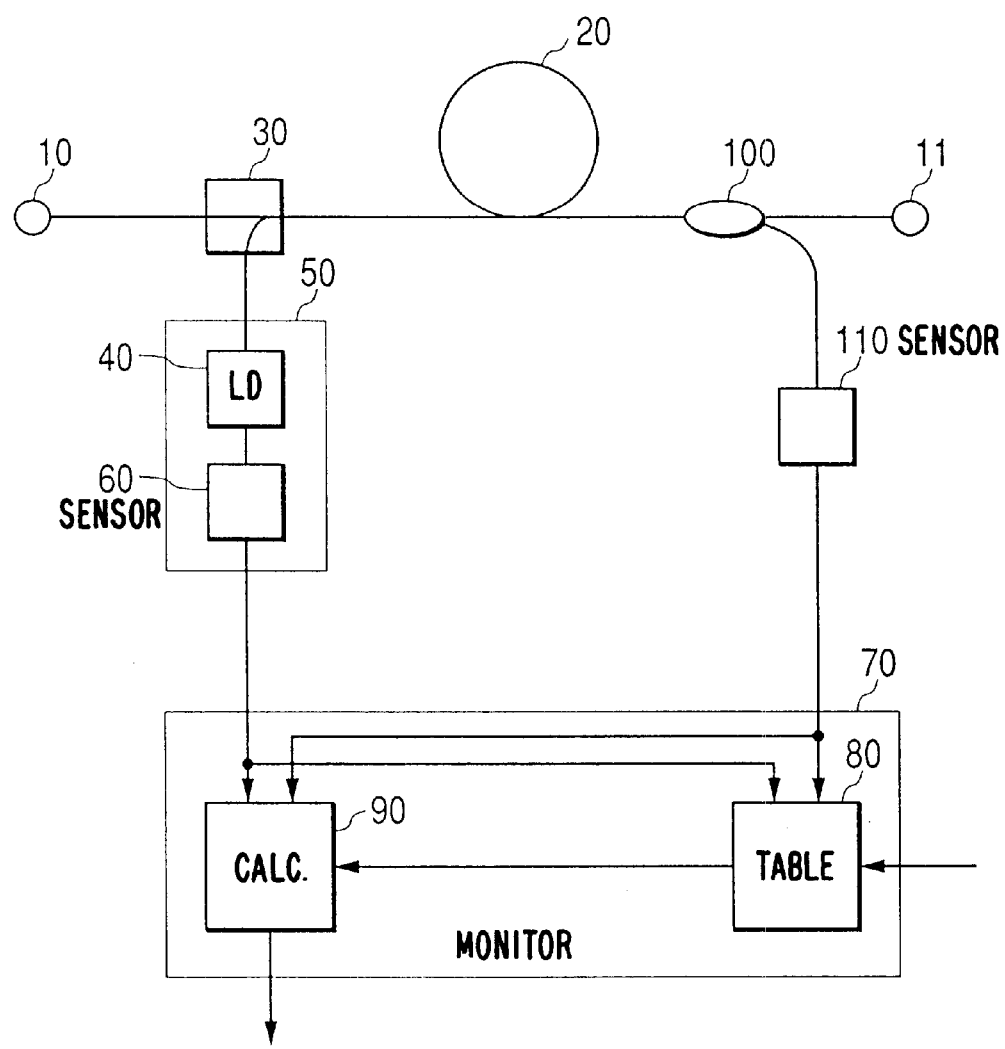
FIG. 7 is a block diagram used to explain the optical amplifier based on a first embodiment of this invention.

FIG. 7 shows the optical amplifier based on the first embodiment of this invention. The optical amplifier is made up of a WDM optical coupler 30 which adds a pumping light to a WDM signal light which is put in through an input port 10, a rare-earth-doped fiber 20 which amplifies the WDM signal coming out of the coupler 30, a pumping device 50 which includes a pumping LD 40 as a pumping light source and an optical sensor 60 for measuring the pumping light power, a tap coupler 100 which takes out part of the output light of the rare-earth-doped fiber 20 while transmitting the majority thereof to an output port 11 another optical sensor 110 which receives the separated light from the tap coupler 100 to measure the output light power of the rare-earth-doped fiber 20, and an amplification characteristic supervisor (will be termed "simple monitor part" hereinafter) 70 which receives the measurement results of the optical sensors 60 and 110 and calculates the gain tilt of the optical amplification medium.

The pumping LD 40, in many cases, incorporates a Fabry-Perot resonator, which emits from one end a laser beam to be fed as the pumping light to the coupler 30 and emits from another end a laser beam to be fed to the optical sensor 60. The optical sensor 60 which takes in the laser power of the pumping LD 40 releases a current which is proportional to the laser power and indicative of the monitored pumping light power (measurement result), and the monitored pumping light power is put into the simple monitor part 70. Similarly, the optical sensor 110 which is sensitive to the tapped output of the tap coupler 100 releases a current which is proportional to the light power and indicative of the monitored output light power to be delivered to the output port 11. The monitored output light power is put into the simple monitor part 70.

The simple monitor part 70 includes a characteristic data table 80 and a calculation part of gain tilt 90. Using temperature data enhances the accuracy of monitoring as mentioned previously.

Figure 8:
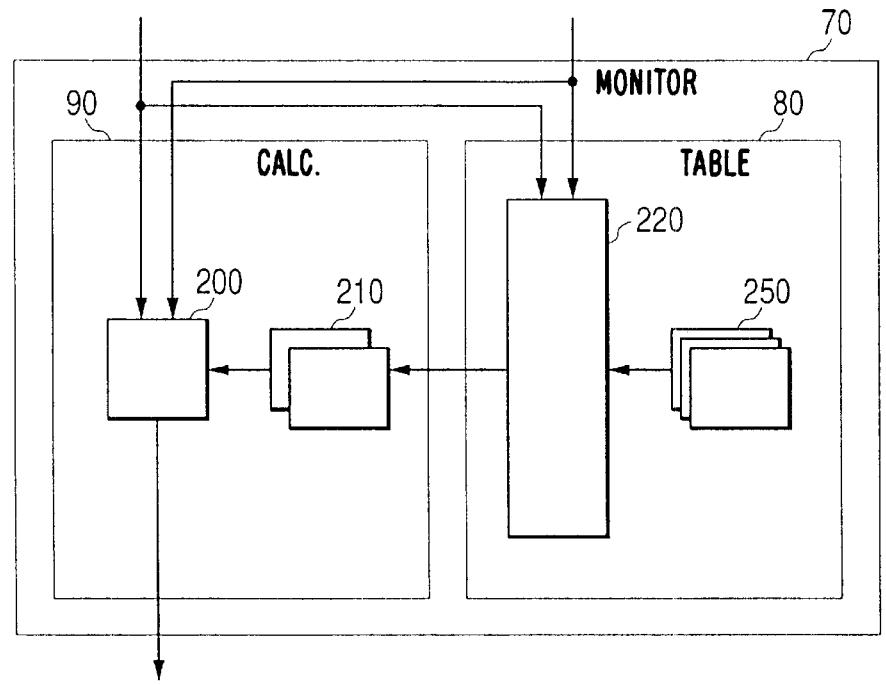
FIG. 8 is a block diagram used to explain an example of the gain monitoring device used in the first embodiment.
Figure 9:
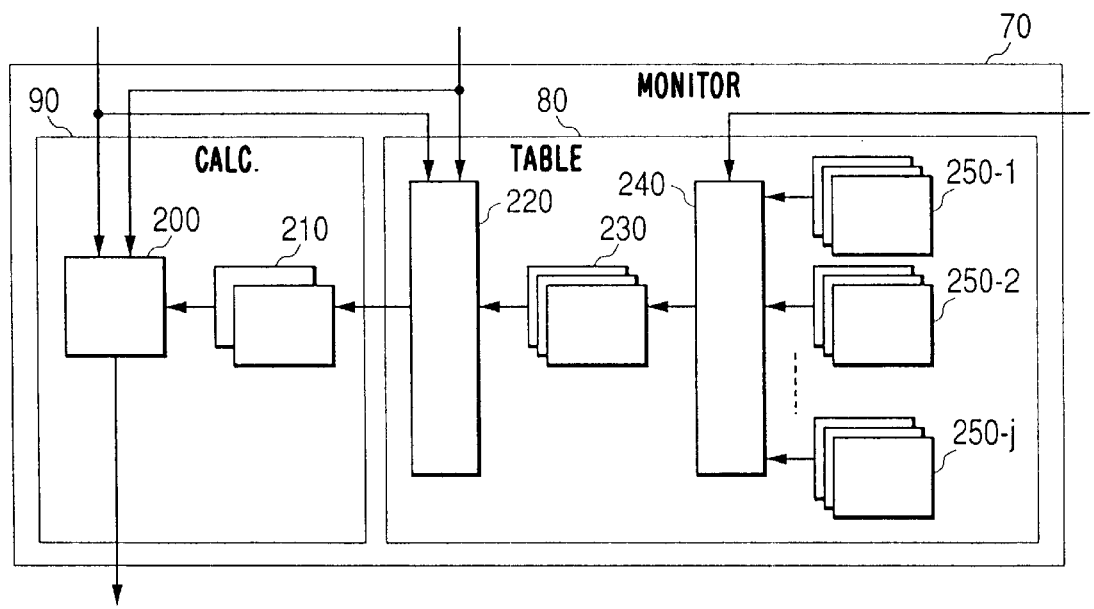
FIG. 9 is a block diagram used to explain another example of the gain monitoring device used in the first embodiment.

FIG. 8 shows the detailed arrangement of the simple monitor part 70 of the case without a temperature-dependent modifying function, and FIG. 9 shows the detailed arrangement of the simple monitor part 70 of the case of having a temperature-dependent modifying function.

In FIG. 8, the characteristic data table 80 has a selector part of proper curve 220 and proper curve table group 250. The curve table group 250 store the proper curves for several gain tilts provided by the preparatory measurement in the form of discrete data or formulas (e.g., linear functions obtained by straight line approximation). The calculation part of gain tilt 90 has a calculation part of interpolation to proper curve 200 and work tables 210. The work tables 210 can hold data of two proper curve tables.

The monitored values of pumping light power and output light power inputted to the simple monitor part 70 branch to be fed to both the characteristic data table 80 and the calculation part of gain tilt 90.

The simply monitoring scheme for the gain tilt of rare-earth-doped fiber (EDF) 20 will further be explained on the flowchart of FIG. 12.

Initially, the monitored pumping light power is measured: (step S1), and next the monitored output light power is measured: (step S2).

Subsequently, the selector part of proper curve 220 of the characteristic data table 80 compares the monitored pumping light power to monitored output light power relation with the proper curves of all gain tilts to select a curve which is nearest to the power relation and an curve which is next nearest to the relation: (step S3).

Specifically, it selects curves which are smallest and next smallest in difference between the output light power derived from the proper curve data in the curve table group 250 by checking the monitored pumping light power and the monitored output light power received by the simple monitor part 70. As an alternative selection scheme of this embodiment, it selects curves which are smallest and next smallest in distance between the measured point (pumping light power to output power relation) and the proper curve (linear function) of each gain tilt.

The two selected proper curves are stored in the work tables 210 of the calculation part of gain tilt 90. The calculation part of interpolation to proper curve 200 of the calculation part of gain tilt 90 compares the monitored pumping light power to monitored output light power relation with the contents of the work tables 210. If a monitored point is on the nearest proper curve (the monitored output light power is equal to the output light power of the curve, or the distance of the monitored point from the derived point of the curve is zero): (step S4), the gain tilt of the proper curve is the one in question: (step S5).

In case that the monitored output light power, that is, the measured point does not exist on the nearest proper curve, the selected next-nearest curve is used to interpolate a gain tilt from the two gain tilts: (step S6).

Figure 10:
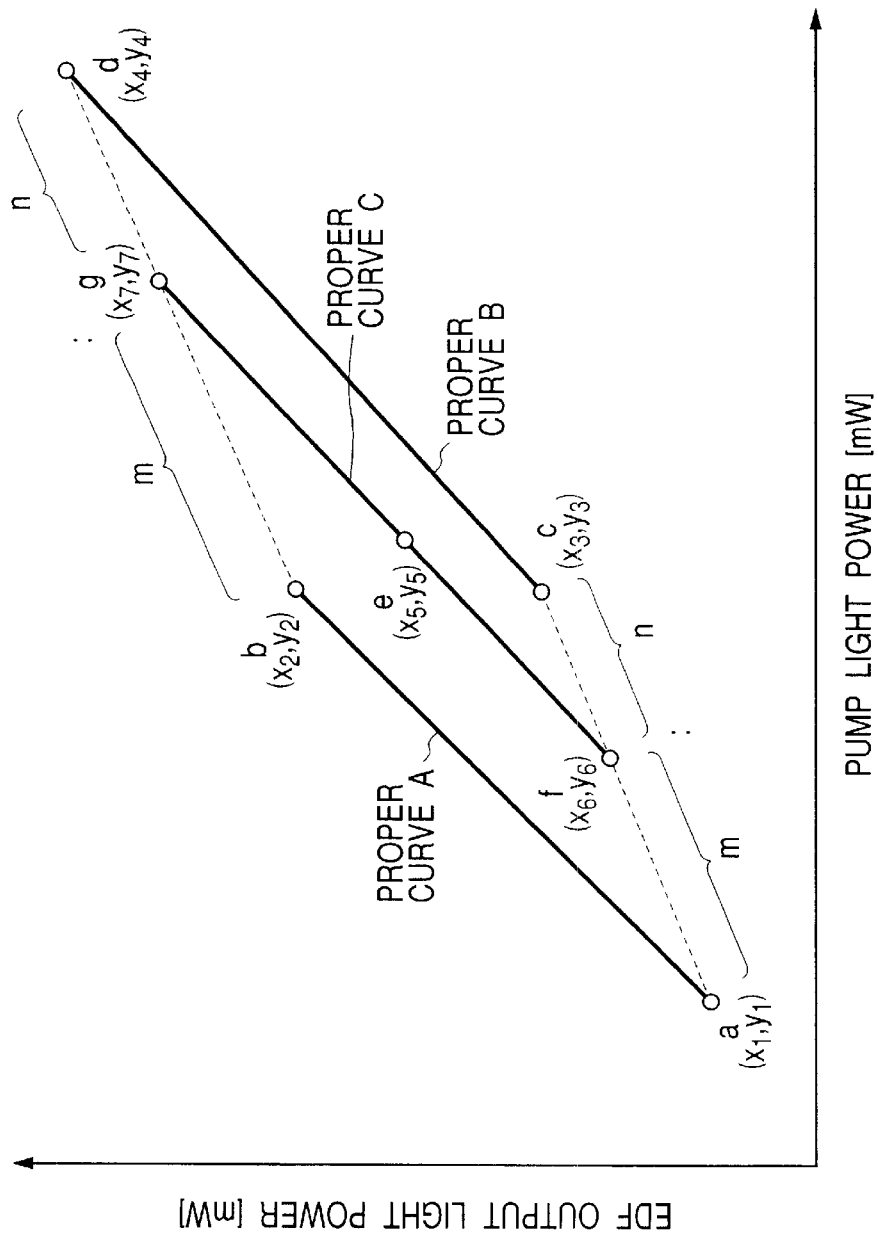
FIG. 10 is a graph used to explain the inventive proper curve which is formulated based on the interpolation.
Figure 11:
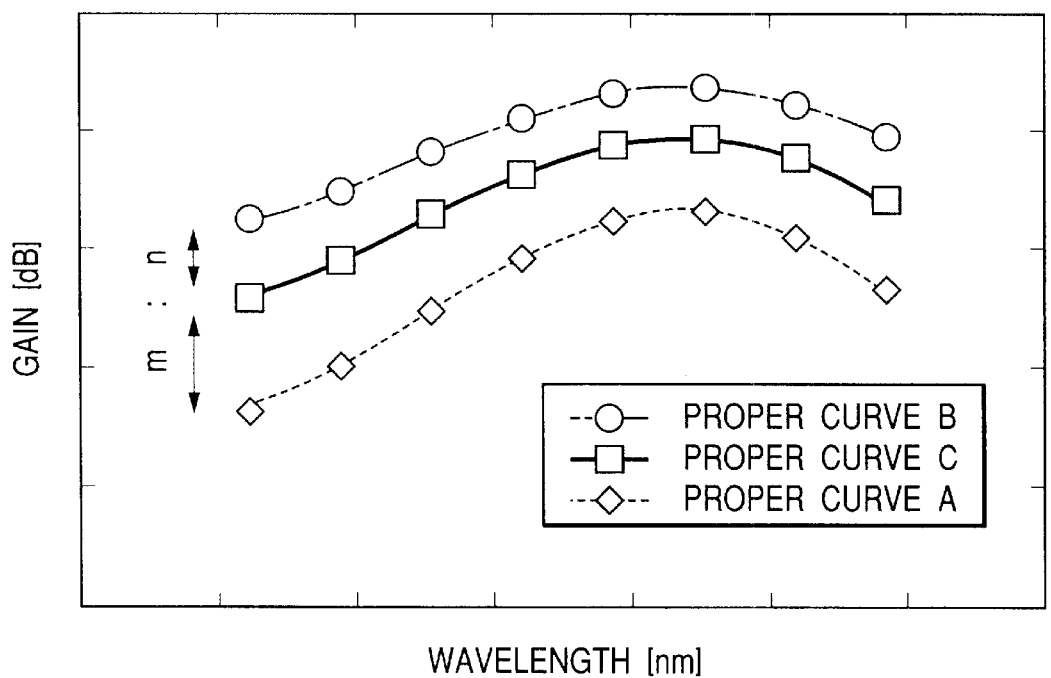
FIG. 11 is a graph used to explain the gain tilt of the inventive proper curve which is formulated based on the interpolation.

FIG. 10 and FIG. 11 show the manner of interpolation. Proper curves A and B in these figures are given curves stored in advance in the characteristic data table 80, and have their gain tilts known. The curve A has its end points expressed by a $(x_1, y_1)$ and b $(x_2, y_2)$, and the curve B has its end points expressed by c $(x_3, y_3)$ and d $(x_4, y_4)$. The points a $(x_1, y_1)$ and c $(x_3, y_3)$ are based on a same input light power and temperature. Similarly, the points b $(x_2, y_2)$ and d $(x_4, y_4)$ are based on a same input light power and temperature. Another point e $(x_5, y_5)$ represents the monitored pumping light power and the monitored output light power measured by the optical sensors 60 and 110. The point e is conceived to be a point existing on an unknown curve C which is to be found by interpolation.

The proper curve C is a straight line which connects a point f $(x_6, y_6)$ resulting from the m:n division of the line segment between the points a $(x_1, y_1)$ and c $(x_3, y_3)$ and another point g $(x_7, y_7)$ resulting from the m:n division of the line segment between the points b $(x_2, y_2)$ and d $(x_4, y_4)$. The values of m and n are expressed in terms the coordinates of the points a through e as follows.

$$\left(y_5 - \frac{my_3 + ny_1}{m+n}\right)\{m(x_4 - x_3) + n(x_2 - x_1)\} = \left(x_5 - \frac{mx_3 + nx_1}{m+n}\right)\{m(y_4 - y_3) + n(y_2 - y_1)\} \quad (1)$$

For evaluating the m:n ratio, such a condition as m+n=1 is imposed so that the above formula is reduced to a quadratic equation for m, and one of two solutions which meets $0 \leq m \leq 1$ is selected. Alternatively, the m:n ratio may be evaluated in algebraic manner from the coordinates of the points a through e.

The resulting proper curve C provides the gain tilt in question based on the rule of proportional distribution: (step S7).

Next, FIG. 11 shows the relation of gain's wavelength dependency among the proper curves A through C. Based on the proportional distribution which is derived from them: n relation of the formula (1), the gain's wavelength dependency of the proper curve C can be obtained from those of the proper curves A and B. In this manner, the gain tilt can be monitored with the calculation part of interpolation to proper curve 200: (step S8).

An alternative simpler manner, instead of using the interpolation explained above, is to have characteristic data tables of proper curves for constant gain tilts and select a table of the most-like curve, although a resulting gain tilt may have a degraded accuracy.

Next, a scheme of improving the monitoring accuracy by use of temperature data will be explained.

In the simple monitor part 70 shown in FIG. 9, the characteristic data table 80 has a selector part of proper curve 220, work tables 230, a part of temperature selector of proper curve/calculation of interpolation to proper curve 240, and proper curve table groups 250-1 through 250-j. This method, as will be explained in connection with FIG. 13, has an additional operation at the beginning for selecting a curve table set in response to the temperature in contrast to the methods explained on FIG. 8 and FIG. 12.

The proper curve table groups 250-1 through 250-j store the proper curves (linear functions obtained by straight line approximation) for several temperatures and several gain tilts provided by the preparatory measurement in the form of discrete data or formulas. The suffixes 1-j of the table sets indicate the correspondence to the different temperatures.

Temperature data resulting from the measurement (step S11) is put into the part of temperature selector/calculator 240. The part of temperature selector/calculator 240 calculates a proper curves for the indicated temperature: (step S12), and stores in the work tables 230.

In case that the given temperature data is equal to the temperature of any of the proper curve table groups 250-1 through 250-j: (step S13), that table group is selected: (step S14) and stored in the work tables 230. If, otherwise, the given temperature data is not equal to those of all curve table groups 250-1 through 250-j, proper curves for the temperature in operation are calculated for individual gain tilts in the same manner of interpolation as explained on FIG. 10: (step S15). In the present case, the known proper curves A and B in FIG. 10 are curves for different temperatures T1 and T2. With the temperature in operation being T3, the m:n ratio is expressed as follows.

$$m:n = (T_1 - T_3):(T_3 - T_2) \quad (2)$$

Proper curve C of the temperature T3 is obtained. Proper curve tables are calculated for individual gain tilts provided in advance, and stored in the work tables 230. The operations (step S16) of the selector part of proper curve 220 and calculation part of gain tilt 90 following the calculation of the proper curve group for the temperature in operation are identical to the case which does not deal with the temperature.

Also in this case, an alternative simpler manner, instead of using the interpolation explained above, is to have data tables of proper curves and select a table of the most-like temperature.

Next, the manner of suppressing the gain tilt based on the inventive gain tilt monitoring will be explained. The implementation of EDF monitoring by including various EDF controls, e.g., constant gain control or constant output control, will first be explained.

Figure 14A:
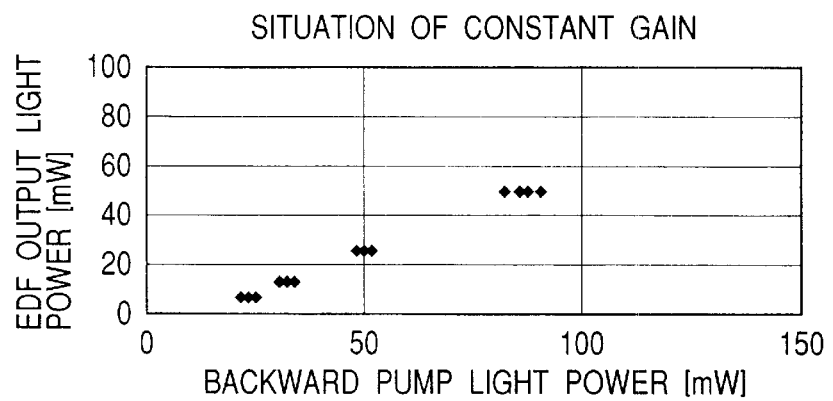
FIGS. 14(a), 14(b) and 14(c) are fifth graphs used to explain the property of rare-earth-doped fiber revealed by the present invention.
Figure 14B:
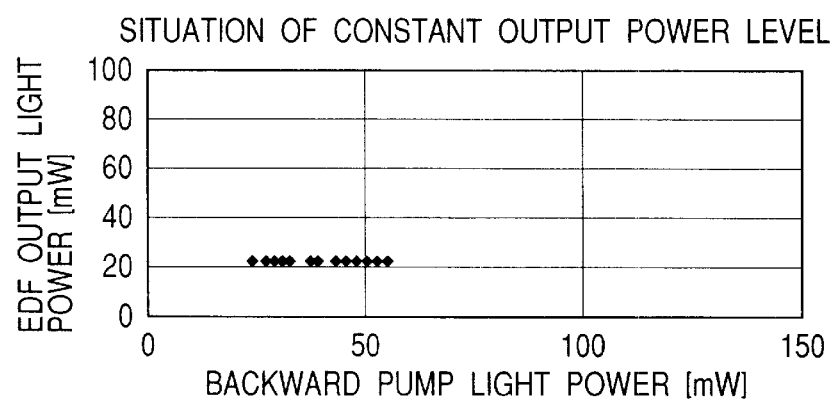
Figure 14C:
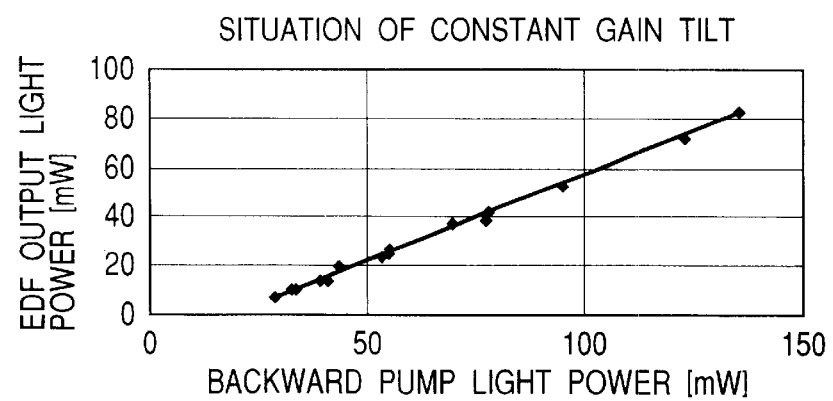

FIGS. 14(*a*), 14(*b*) and 14(*c*) are graphs resulting from a series of experiments, showing the pumping light power to output light power relation conditioned by certain EDF control. FIG. 14(*a*) shows the pumping light power to output light power relation with constant gain control rather than having a suppressed gain tilt. This experiment was conducted by using an EDF having a length of 300 m and a 4-channel WDM input signal light having wavelengths of 1570, 1579, 1589 and 1599 nm. The input signal light power was set to −28, −25, −22 and −19 dBm/ch, and the temperature was set to four cases of 0, 25, 50 and 70° C. The EDF was subjected to bidirectional pumping, with the forward pumping LD having a constant pumping power of 167 mW. The total input light power of all channels and EDF output light power were measured, and the pumping light power of the backward pumping LD was adjusted so that the gain, i.e., the input to output power ratio, is constant at 30 dB. Due to the constant gain control, in which the necessary pumping power varies slightly depending on the temperature, the pumping light power to output light power relation is plotted along steps.

FIG. 14(*b*) shows the pumping light power to output light power relation with constant output control. The same 4-channel WDM signal light as the case of FIG. 14(*a*) was set to −28, −25, −22 and −19 dBm/ch, and the temperature was set to four cases of 0, 25, 50 and 70° C. The backward pumping light power was adjusted so that the EDF output is constant at 13.7 dBm. Due to the constant output control, in which the necessary pumping power to get the same gain varies depending on the temperature or input light power, the pumping light power to output light power relation is plotted along a horizontal line.

FIG. 14(*c*) shows for reference the pumping light power to output light power relation plotted with the condition of minimum gain tilt and with the same other conditions of input signal light and temperature as the cases of FIGS. 14(*a*) and 14(*b*). The relation is plotted on a straight line as mentioned previously.

The inventive monitoring is applicable to the cases of constant gain control and constant output control shown in FIGS. 14(*a*) and 14(*b*).

Figure 15:
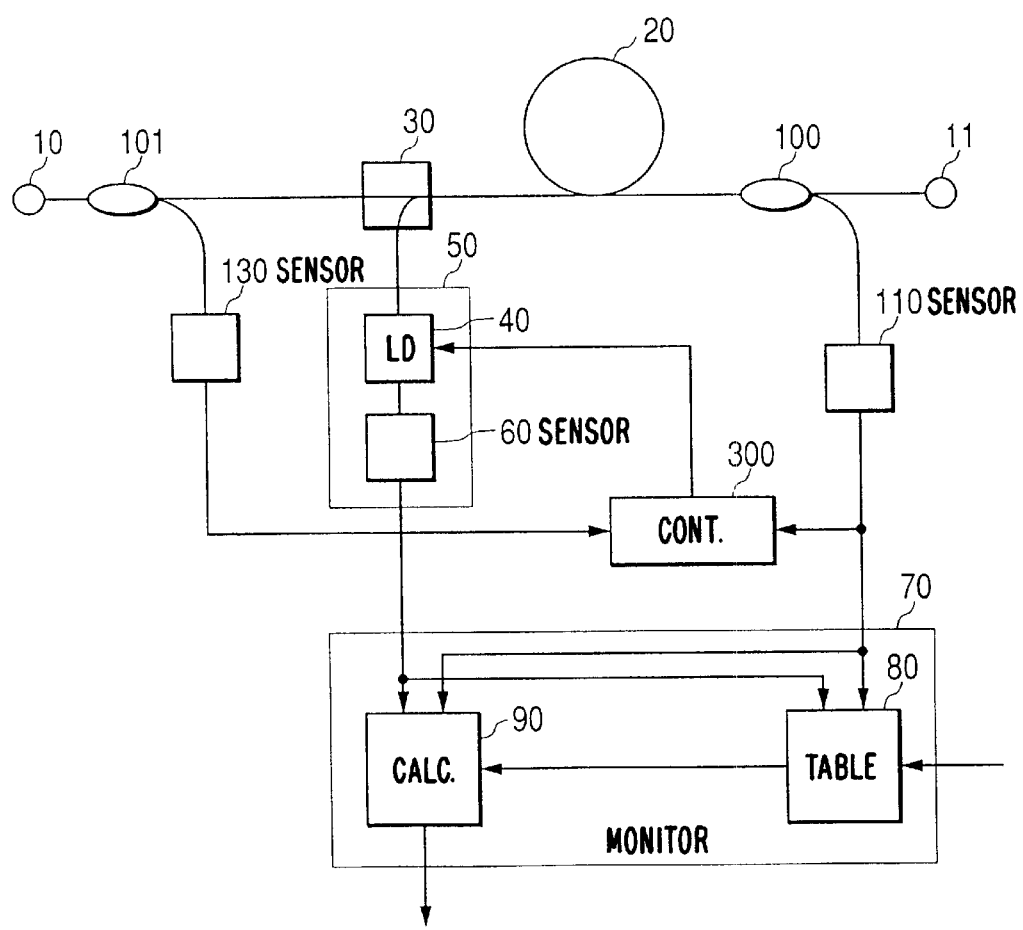
FIG. 15 is a block diagram used to explain a second embodiment of this invention.
Figure 16:
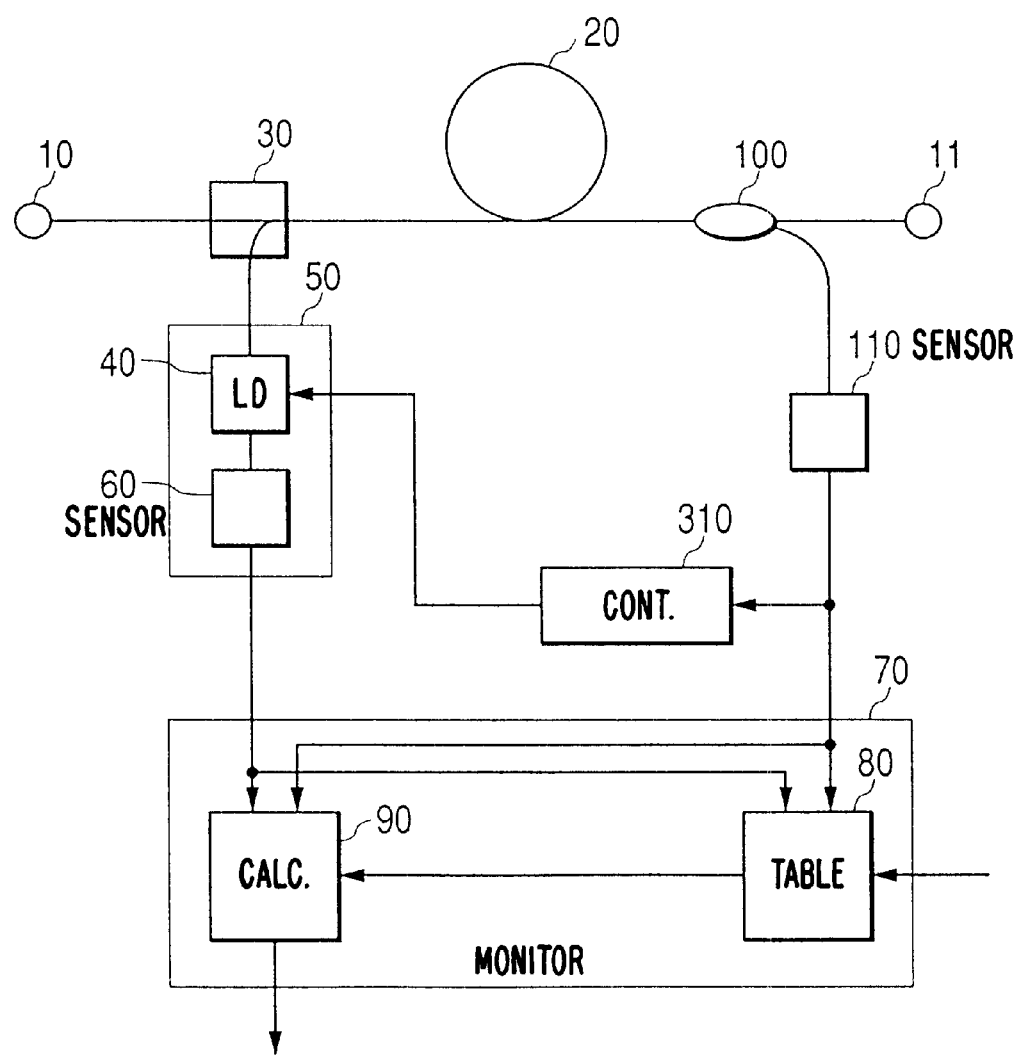
FIG. 16 is a block diagram used to explain a third embodiment of this invention.

FIG. 15 and FIG. 16 show examples of optical amplifiers which are arranged to implement the constant gain control and constant output control, respectively.

The optical amplifier of FIG. 15 is derived from the one shown in FIG. 7, with a tap coupler 101, optical sensor 130 and constant gain controller 300 being added. The signal light put in through the input port 10 is partially taken out by the tap coupler 101, and its power is monitored with the optical sensor 130. The constant gain controller 300 evaluates the gain of optical amplifier from the ratio of light powers monitored by the optical sensors 60 and 130, and operates on the pumping LD 40 through a control signal so that it decreases or increases the pumping light power in response to a larger or smaller measured gain relative to the preset value, thereby attaining a constant gain.

The optical amplifier of FIG. 16 is derived from the one shown in FIG. 7, with a constant output controller 310 being added. The constant output controller 310 operates on the pumping LD 40 through a control signal so that it decreases or increases the pumping light power in response to a larger or smaller light output monitored by the optical sensor 60 relative to the preset value, thereby attaining a constant output.

In both cases of constant gain control and constant output control, gain tilt data produced by the simple monitor part 70 is released. The manner of suppressing the gain tilt based on this gain tilt data will be explained.

Figure 17:
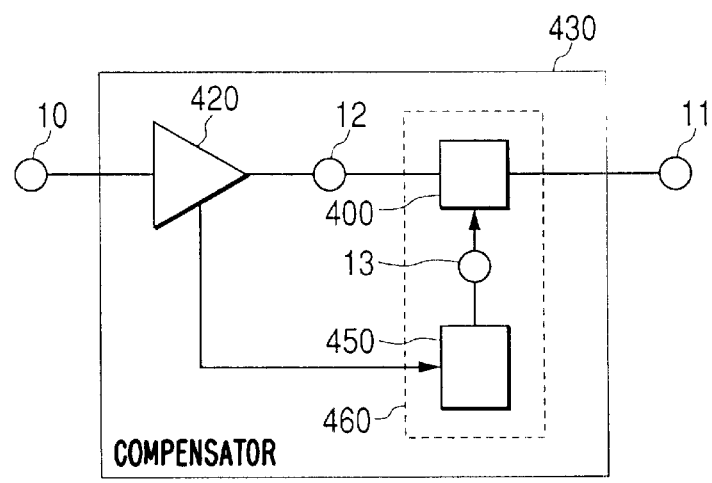
FIG. 17 is a block diagram used to explain a fourth embodiment of this invention.

FIG. 17 shows an example of arrangement of the optical amplifier based on this invention. This optical amplifier with compensation part of gain tilt 430 being attached thereto, is made up of an optical amplifier with simple monitor part 420, a compensation part of amplification characteristic 460, an input port 10, and an output port 11. The compensation part 460 includes a gain tilt compensator 400 and a controller for gain tilt compensator 450.

The input WDM signal light put in through the input port 10 is amplified by the optical amplifier with simple monitor part 420, and the output signal is put into the gain tilt compensator 400 via a port 12. The optical amplifier with simple monitor part 420 can be of any control scheme (constant gain control or constant output control). The amplifier 420 monitors the state of the gain tilt in the manner described previously and puts the monitored result into the controller for gain tilt compensator 450.

The controller for gain tilt compensator 450 calculates the gain characteristics to be compensated in accordance with the monitored result, and releases the calculation result as a control signal of the gain tilt compensator 400. The gain tilt compensator 400 compensates the gain tilt which results from the variation of input light power or temperature generating in the amplifier 420 in accordance with the control signal received via a port 13. In consequence, the output signal light with its gain tilt compensated is sent out through the output port 11 over the transmission path.

Some examples of arrangement and operation of the gain tilt compensator 400 will be explained in detail.

Figure 18:
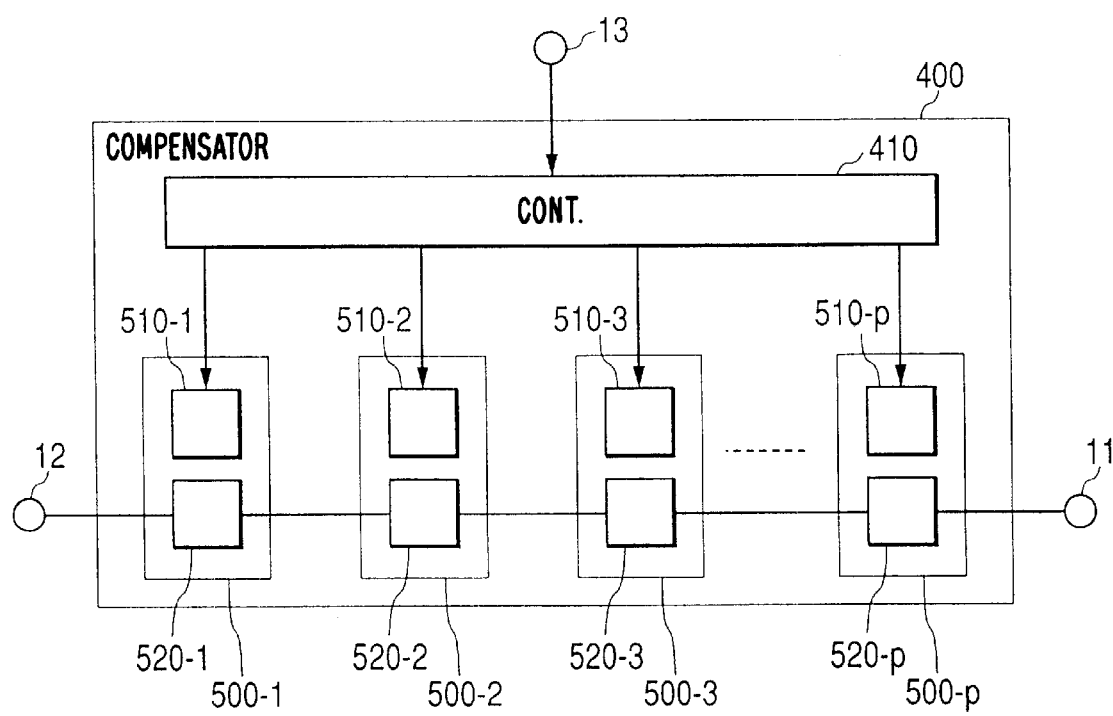
FIG. 18 is a block diagram used to explain a first example of the gain tilt compensator which is used in the fourth embodiment of this invention.

FIG. 18 shows a first example of arrangement of the gain tilt compensator 400 which suppresses the gain tilt. The gain tilt compensator 400 includes a control part of gain tilt compensation 410, and compensation parts of gain tilt 500-1 through 500-$p$. The number pin dicates the number of multiplexed wavelengths. The WDM signal light put in through the input port 12 passes through the compensation parts 500-1 through 500-$p$ and released through the output port 11. The compensation parts 500-1 through 500-$p$ include heaters 510-1 through 510-$p$ and variable optical pass devices 520-1 through 520-$p$, respectively.

Figure 19:
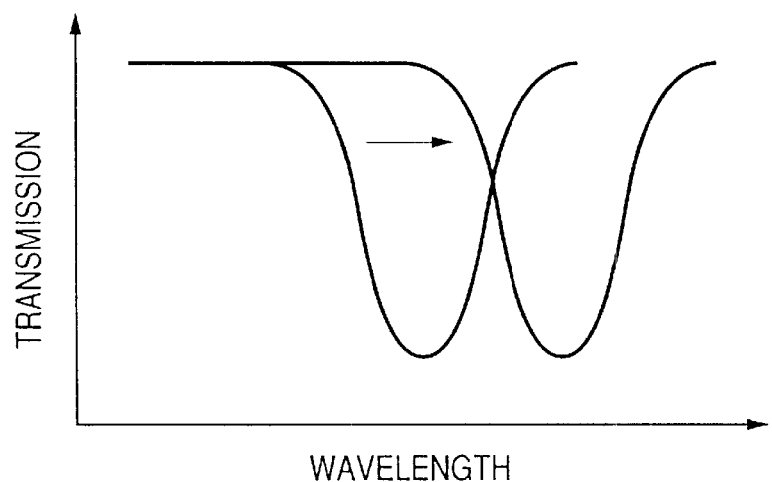
FIG. 19 is a graph used to explain the transmission characteristics of the variable wavelength band-pass filter used in the first example of the gain tilt compensator.

The variable optical pass devices 520-1 through 520-$p$ have a light conduction characteristic as shown in FIG. 19, and can be formed of a long-period fiber Bragg grating element. The light conduction characteristic of the devices 520-1 through 520-$p$ shifts in response to the heat from the outer side as shown by the arrow in FIG. 19. By providing each optical pass device with a light conduction characteristic which corresponds to the signal light wavelength, the gain characteristics of arbitrary wavelengths of the WDM signal light can be varied.

The control part of gain tilt compensation 410 determines the conduction characteristics of the variable optical pass devices 520-1 through 520-$p$ in accordance with the control signal provided by the controller for gain tilt compensator 450, and controls the heaters 510-1 through 510-$p$ attached to the variable optical pass devices 520-1 through 520-$p$. The number p of compensation part of gain tilt, which is equal to the number of multiplexed wavelengths in this example, can be smaller in consideration of the convenience of packaging or cost, in which case however, the degree of freedom of gain tilt compensation decreases and the control accuracy falls to some extent.

Figure 20:
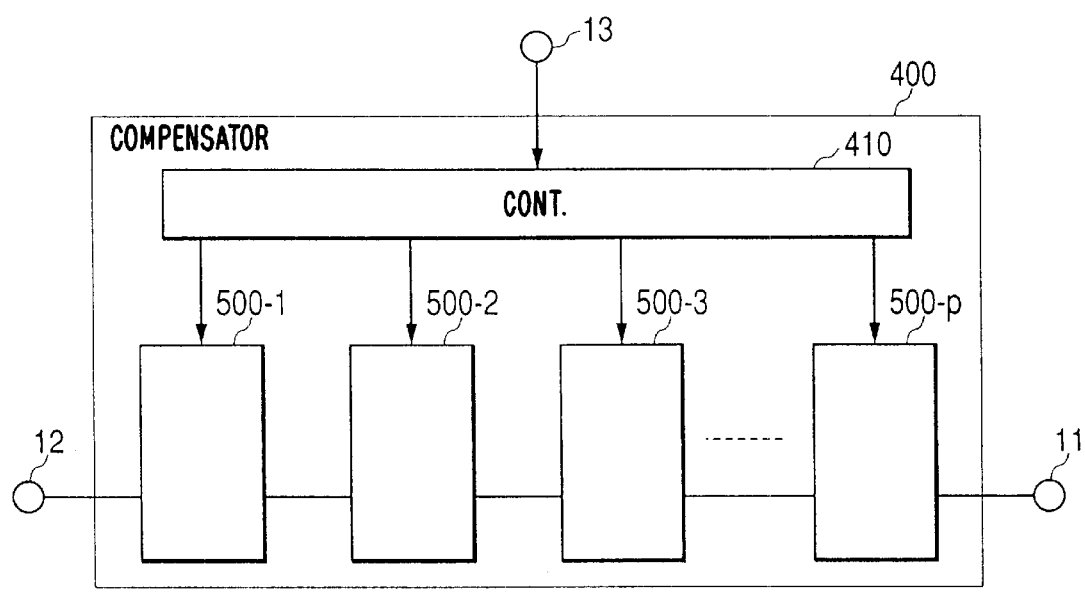
FIG. 20 is a block diagram used to explain a second example of the gain tilt compensator which is used in the fourth embodiment of this invention.

FIG. 20 shows a second example of arrangement of the gain tilt compensator which suppresses the gain tilt. The gain tilt compensator 400 includes a control part of gain tilt compensation 410, and compensation parts of gain tilt 500-1 through 500-$p$. The WDM signal light put in through the input port 12 passes through the compensation parts 500-1 through 500-$p$ and released through the output port 11.

Figure 21:
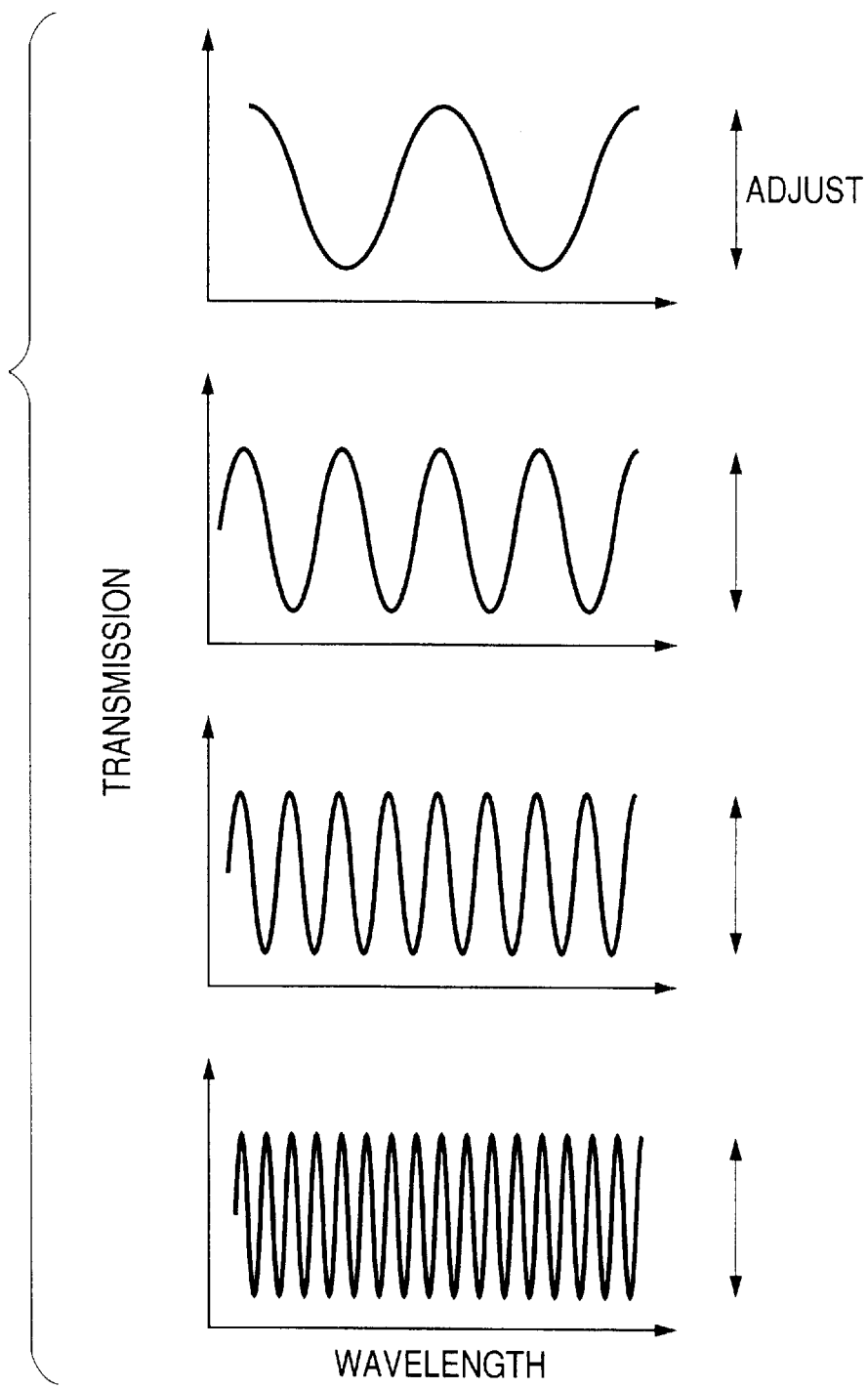
FIG. 21 is a graph used to explain the transmission characteristics of the variable wavelength band-pass filter which is used in the second example of the gain tilt compensator.

The compensation parts 500-1 through 500-$p$ have conduction characteristic as shown in FIG. 21, and their amplitude of conduction factors can be adjusted in response to the individual control signals. Each compensation part can be formed of a Mach-Zender optical device. The amplitude can also be varied by varying the magnitude of light path difference in response to the control signal. Based on the conduction characteristics of different wavelength periods of the compensation parts of gain tilt 500-1 through 500-$p$, an intended gain tilt compensation can be performed.

By setting the wavelength period to be W×$2^k$ (where W is the base period and k is a non-negative integer smaller than i), it is possible theoretically, by setting an infinite value to i, to have a gain tilt compensator which can vary the gain characteristic of an arbitrary WDM signal light. A real compensator however cannot have an infinite value of i, and it is actually set to be a number roughly smaller than 10, with the optimal wavelength period being determined in advance depending on the wavelength composition of the WDM signal light. The control part of gain tilt compensation 410 controls the compensation parts 500-1 through 500-$p$ by determining their conduction characteristics based on the control signal provided by the controller for gain tilt compensator 450 through the port 13.

Figure 22:
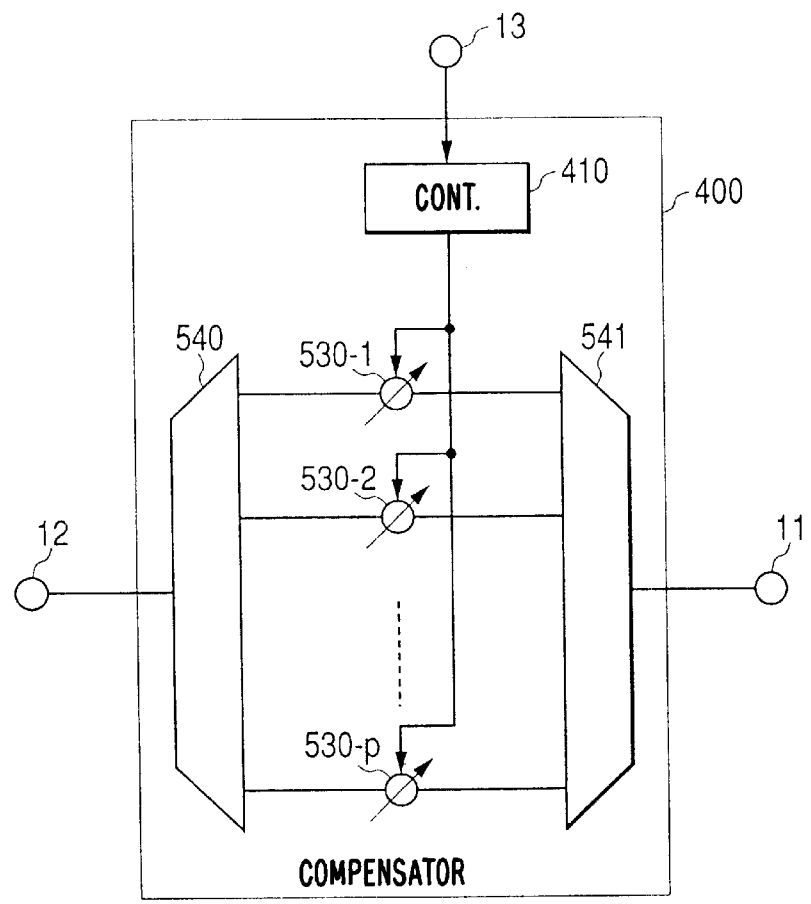
FIG. 22 is a block diagram used to explain a third example of the gain tilt compensator which is used in the fourth embodiment of this invention.

FIG. 22 shows a third example of arrangement of the gain tilt compensator 400 which suppresses the gain tilt. The gain tilt compensator 400 includes a control part of gain tilt compensation 410, a WDM signal light branching part 540, variable optical attenuators 530-1 through 530-$p$, and a WDM signal light multiplexing part 541. The WDM signal light put in through the input port 12 is separated into signal lights of individual wavelengths, conducted through the variable optical attenuator parts 530-1 through 530-$p$, and released through the output port 11. The control part of gain tilt compensation 410 controls the attenuators 530-1 through 530-$p$ by determining their attenuation characteristics based on the control signal provided by the controller for gain tilt compensator 450 through the port 13.

Figure 23:
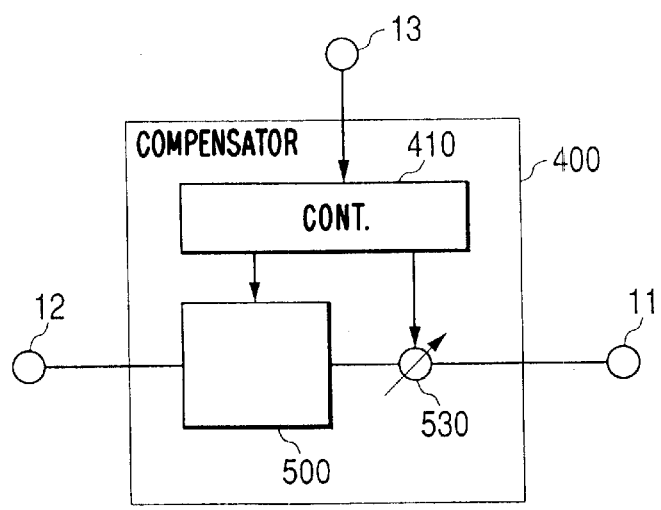
FIG. 23 is a block diagram used to explain a fourth example of the gain tilt compensator which is used in the fourth embodiment of this invention.
Figure 24:
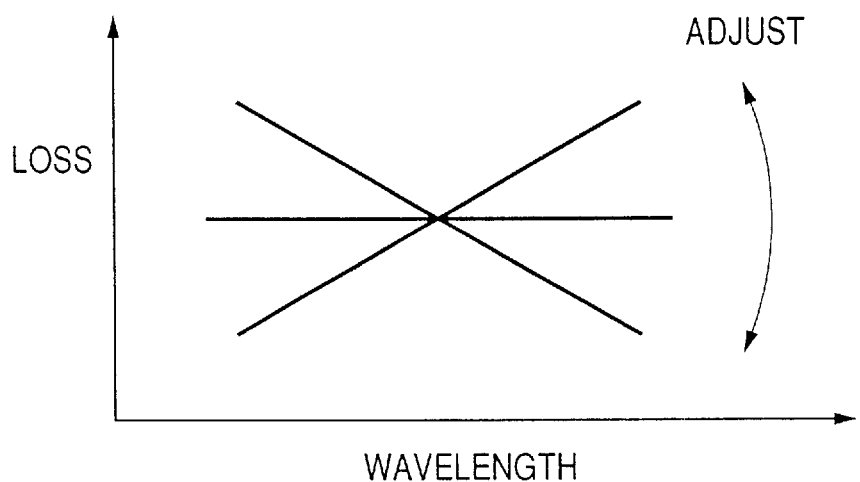
FIG. 24 is a graph used to explain the transmission characteristics of the variable wavelength band-pass filter which is used in the fourth example of the gain tilt compensator.

FIG. 23 shows a fourth example of arrangement of the gain tilt compensator 400 which suppresses the gain tilt. The gain tilt compensator 400 includes a control part of gain tilt compensation 410, a gain tilt compensation part 500, and a variable optical attenuator part 530. The WDM signal light put in through the input port 12 is conducted through the compensation part 500 and attenuator part 530, and released through the output port 11. The compensation part of gain tilt 500 has a conduction characteristic as shown in FIG. 24, thereby adjusting the conduction loss in response to the control signal.

The compensation part of gain tilt 500, which can be a Mach-Zender optical device, varies the magnitude of light path difference in response to the control signal, thereby varying the slope of loss. The control part of gain tilt compensation 410 controls the compensation part 500 by determining its slope of loss based on the control signal provided by the controller for gain tilt compensator 450 through the port 13 so that the WDM signal light amplified by the optical amplification medium has its gain tilt nullified.

In case that the amplification characteristics of the optical amplification medium has a large temperature dependency, the total output light power may vary, and in this case the control part of gain tilt compensation 410 further adjusts the optical attenuation of the variable optical attenuator 530, thereby attaining a constant output of all WDM signal lights.

Figure 25:
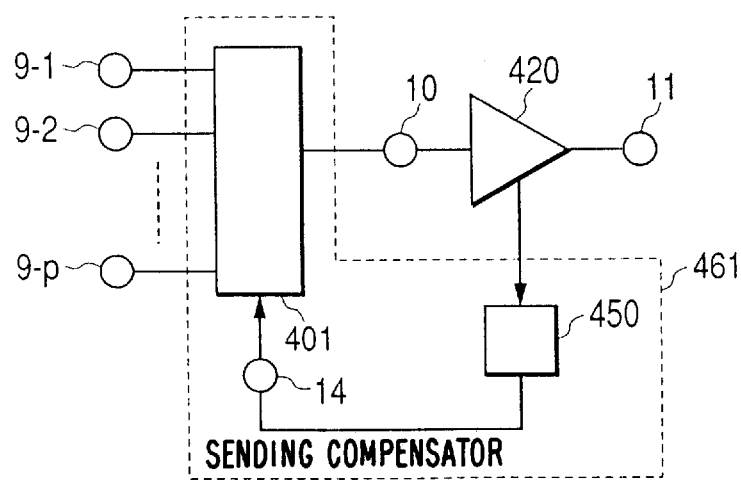
FIG. 25 is a block diagram used to explain the optical transmission system based on a first embodiment of this invention.

FIG. 25 shows an example of arrangement of the optical transmission system based on this invention. The optical transmission system includes an optical amplifier with simple monitor part 420, a sending compensation part of amplification characteristic 461, input ports 9-1 through 9-$p$, and an output port 11. The sending compensation part 461 includes a sending gain tilt compensator 401 and a controller for gain tilt compensator 450. The sending gain tilt compensator 401 has signal light transmitters which are supplied through the input ports 9-1 through 9-$p$ with the signal lights of individual wavelengths before multiplexing, and the transmitters have their output levels individually varied so that the gain tilt is suppressed as the whole system. The signal lights, with their output levels being adjusted, are multiplexed to become a WDM signal light, which is released to the output port 10.

The optical amplifier with simple monitor part 420, which can be based on any control scheme, amplifies the WDM signal light provided by the sending gain tilt compensator 401 through the output port 10. The optical amplifier with simple monitor part 420 itself can be of any control scheme. It monitors the state of gain tilt and releases the monitored data to the controller for gain tilt compensator 450 in the same procedure as mentioned previously. The controller 450 calculates the gain characteristics to be compensated in accordance with the data and releases the calculation result as a control signal for controlling the sending gain tilt compensator 401. The compensator 401 responds to the control signal provided through the port 14 to control each signal light power so as to offset the gain tilt created by the optical amplifier with simple monitor part 420 due to the variation of input light power or temperature. The output light with the compensation of gain tilt is sent out through the output port 11 over the transmission path.

Next, some examples of the arrangement and operation of the sending gain tilt compensator 401 will be explained in detail.

Figure 26:
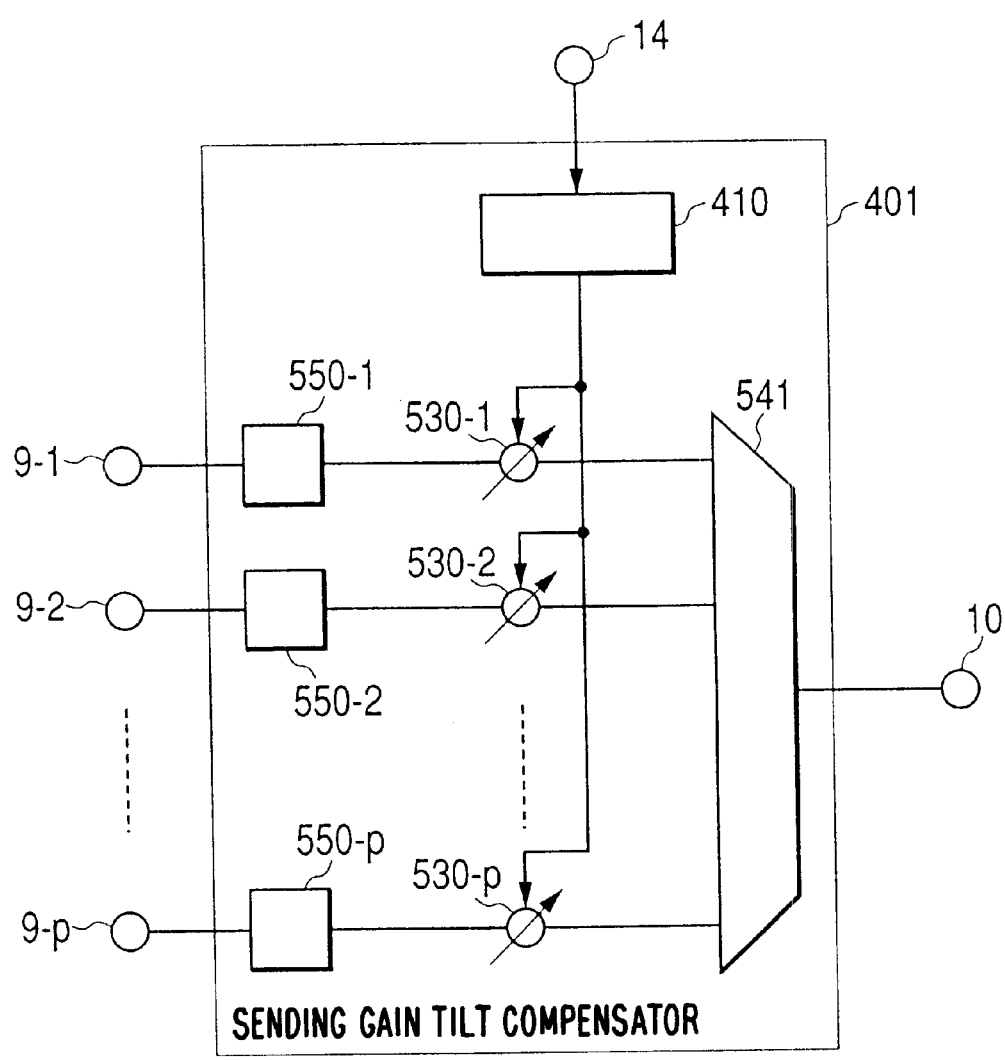
FIG. 26 is a block diagram used to explain a first example of the sending gain tilt compensator which is used in the optical transmission system of the first embodiment.

FIG. 26 shows a first example of arrangement of the sending gain tilt compensator 401 which suppresses the gain tilt. The gain tilt compensator 401 includes a control part of gain tilt compensation 410, transmitting parts 550-1 through 550-$p$, variable optical attenuator parts 530-1 through 530-$p$, and a WDM signal light multiplexing part 541. The signal lights before multiplexing which are put in through the ports 9-1 through 9-$p$ are fed through the transmitting parts 550-1 through 550-$p$ and variable optical attenuator parts 530-1 through 530-$p$, respectively, multiplexed by the WDM signal light multiplexing part 541, and released through the output port 10.

The control part of gain tilt compensation 410 controls the variable optical attenuator parts 530-1 through 530-$p$ by determining their attenuation characteristics based on the control signal provided by the compensator controller 450 through the port 14.

The WDM signal light sent out from the output port 10 of FIG. 26 does not necessarily have an equal power level of all signal lights, but has its gain tilt suppressed by control at the output of the optical amplifier with simple monitor part 420 in FIG. 25.

Although the transmitting parts 550-1 through 550-$p$ have individual variable optical attenuator parts 530-1 through 530-$p$ in the example of FIG. 26, an alternative design is to use a variable optical attenuator commonly for several transmitting parts for the sake of easy control and low cost.

Figure 27:
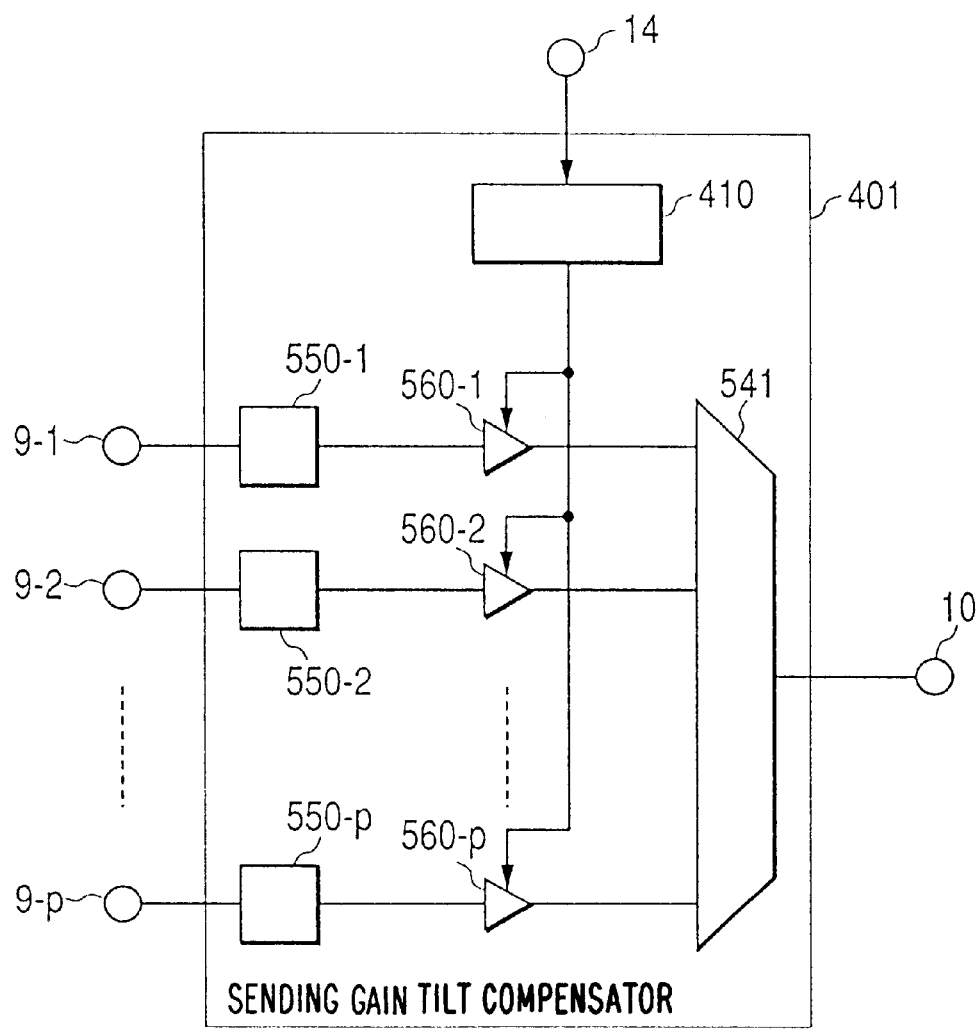
FIG. 27 is a block diagram used to explain a second example of the sending gain tilt compensator which is used in the optical transmission system of the first embodiment.

FIG. 27 shows a second example of arrangement of the sending gain tilt compensator 401 which suppresses the gain tilt. The gain tilt compensator 401 includes a control part of gain tilt compensation 410, transmitting parts 550-1 through 550-$p$, variable optical amplifying parts 560-1 through 560-$p$, and a WDM signal light multiplexing part 541. The signal lights before multiplexing which are put in through the ports 9-1 through 9-$p$ are fed through the transmitting parts 550-1 through 550-$p$ and variable optical amplifying parts 560-1 through 560-$p$, respectively, multiplexed by the WDM signal light multiplexing part 541 into a WDM signal light, and released through the output port 10. The control part of gain tilt compensation 410 controls the variable optical amplifying parts 560-1 through 560-$p$ by determining their amplification characteristics based on the control signal provided by the controller for gain tilt compensator 450 through the port 14.

The WDM signal light sent out from the output port 10 of FIG. 27 does not necessarily have an equal power level of all signal lights, but has its gain tilt suppressed by control at the output of the optical amplifier with simple monitor part 420 in FIG. 25.

Although the transmitting parts 550-1 through 550-$p$ have individual variable optical amplifying parts 560-1 through 560-$p$ in the example of FIG. 27, an alternative design is to use a variable optical amplifying part commonly for several transmitting parts for the sake of easy control and low cost.

It is not always necessary for the foregoing gain tilt compensators 400 and sending gain tilt compensators 401 to be allotted to the optical amplifiers with simple monitor part individually.

Figure 28:
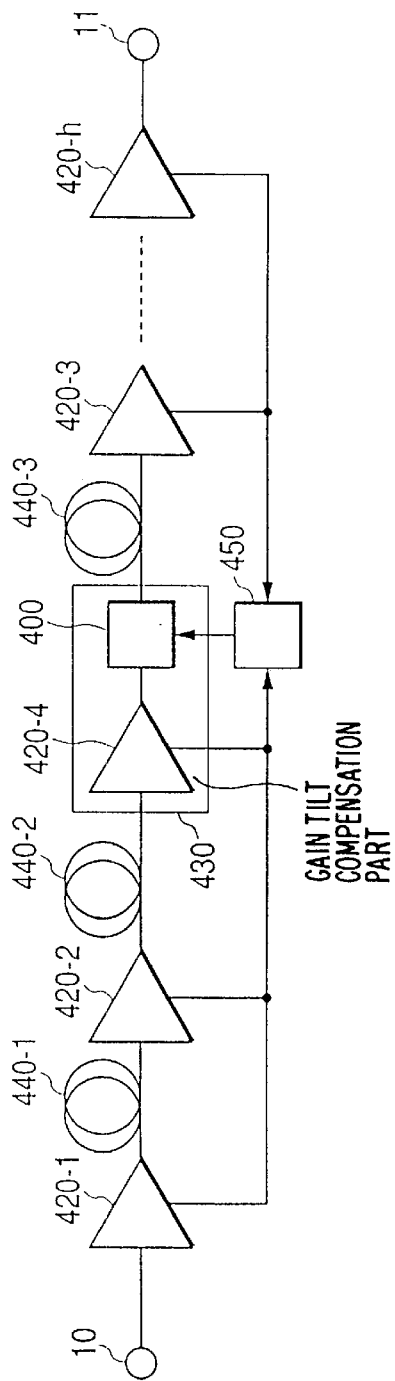
FIG. 28 is a block diagram used to explain the optical transmission system based on a second embodiment of this invention.
Figure 29:
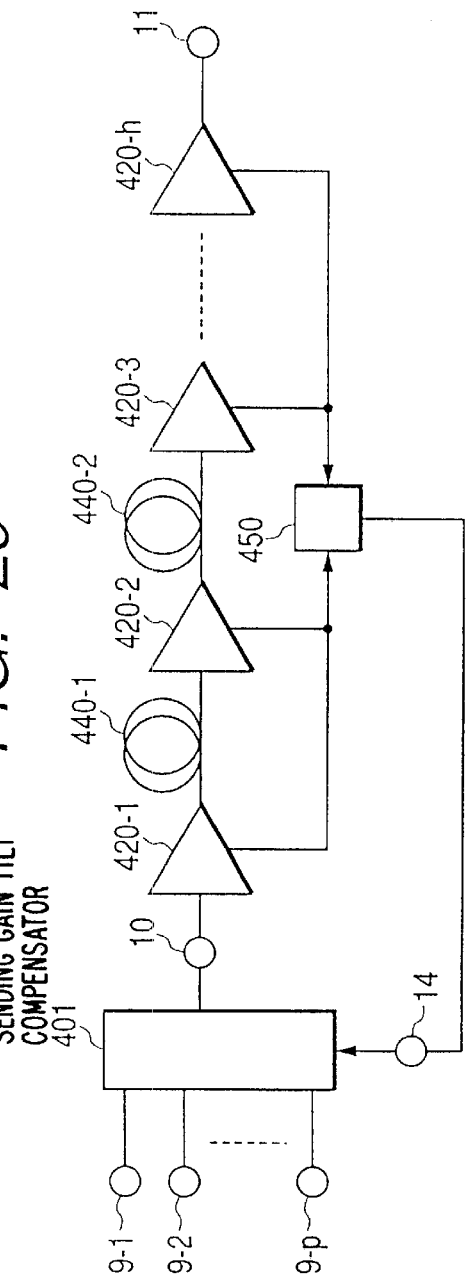
FIG. 29 is a block diagram used to explain the optical transmission system based on a third embodiment of this invention.

FIG. 28 and FIG. 29 show examples of system configuration in which a set of gain tilt compensator 400 and sending gain tilt compensator 401 are allotted commonly to several optical amplifiers with simple monitor part.

Shown in FIG. 28 is an example of system configuration in which one gain tilt compensator 400 is allotted commonly to optical amplifiers with simple monitor part 420-1 through 420-$h$ (where h indicates the number of repeaters). This optical transmission system includes an input port 10, optical amplifiers with simple monitor part 420-1 through 420-$h$, optical transmission paths 440-1 through 440-$h$, an optical amplifier with compensation part of gain tilt 430, a controller for of gain tilt compensator 450, and an output port 11.

The WDM signal light put in through the input port 10 is amplified by the inventive optical amplifiers with simple monitor part 420-1 through 420-$h$. The optical amplifiers 420-1 through 420-$h$ can be based on any control scheme.

The optical amplifiers 420-1 through 420-$h$ monitor the states of gain tilt respectively and release the monitored data to the controller for gain tilt compensator 450 in the same procedure as mentioned previously. The controller 450 sums the monitored data to calculate the gain characteristics to be compensated by the gain tilt compensator 400. The gain tilt compensator 400 of the optical amplifier with compensation part of gain tilt 430 is controlled in accordance with the calculation result so as to compensate the gain tilt created by the optical amplifiers with simple monitor part 420-1 through 420-h due to the variation of input light power or temperature. The output light with the compensation of gain tilt is sent out through the output port 11 over the transmission path.

Shown in FIG. 29 is another example of system configuration in which one sending gain tilt compensator 401 is allotted commonly to optical amplifiers with simple monitor part 420-1 through 420-h. This optical transmission system includes optical amplifiers with simple monitor part 420-1 through 420-h, a sending gain tilt compensator 401, a controller for gain tilt compensator 450, and an output port 11. The sending gain tilt compensator 401 has signal light transmitters which are supplied through the input ports 9-1 through 9-p with the signal lights of individual wavelengths before multiplexing, and the transmitters have their output levels varied so that the gain tilt is suppressed as the whole system. The controlled signal lights of individual wavelengths are multiplexed to become a WDM signal light, which is released to the output port 10.

The WDM signal light coming from the sending gain tilt compensator 401 through the input port 10 is amplified by the inventive optical amplifiers with simple monitor part 420-1 through 420-h. The optical amplifiers 420-1 through 420-h can be based on any control scheme.

The optical amplifiers 420-1 through 420-h monitor the states of gain tilt and release the monitored data to the controller for gain tilt compensator 450 in the same procedure as mentioned previously. The controller 450 sums the monitored data to calculate the gain characteristics to be compensated by the sending gain tilt compensator 401. The controller 450 calculates the gain characteristics to be compensated in accordance with the provided data and releases the calculation result as a control signal for controlling the compensator 401. The compensator 401 responds to the control signal provided through the port 14 to control each signal light power so as to offset the gain tilt created by the optical amplifiers with simple monitor part 420-1 through 420-h due to the variation of input light power or temperature. The output light with the rendition of gain tilt modification is sent out through the output port 11 over the transmission path.

In the foregoing embodiments of this invention, the simple monitor part (compensation part of amplification characteristic) 70 can be configured as a digital circuit of a semiconductor integrated circuit including a memory and CPU (central processing unit) and it is capable of monitoring the gain tilt of optical amplifier without using expensive optical parts such as the AWG or variable optical band-pass filter for separating the WDM signal light.

The present invention can accomplish an optical amplifier and optical amplification method based on a smaller number of parts, simpler structure and smaller power consumption. Particularly, it is capable of equalizing the light power of signal lights at the receiver following the separation of the WDM signal light, while having a simpler structure with a smaller number of parts.

According to the foregoing embodiments of this invention, it is possible, in the manner without using expensive optical parts, to monitor the gain tilt created by the optical amplifier in amplifying a WDM signal light. By suppressing the gain tilt in accordance with gain tilt data provided by the inventive monitoring, an optical amplifier for WDM signal light which is superior in amplification characteristics, simple in structure and inexpensive can be accomplished. The inventive optical amplifier is useful for constructing an optical communication system which is superior in transmission characteristics, simple in structure and inexpensive.

It is further understood by those skilled in the art that the foregoing description is a preferred embodiment of the disclosed device and that various changes and modifications may be made in the invention without departing from the spirit and scope thereof.

What is claimed is:

1. An optical amplifier comprising:

an optical amplification medium which has simultaneous inputs of a WDM (Wavelength Division Multiplex) signal light and a pumping light and amplifies the WDM signal light, a light source which generates the pumping light, and an amplification characteristic supervisor part which evaluates a gain tilt of amplified signal lights of different wavelengths which form the WDM signal light, wherein the amplification characteristic supervisor part is provided in advance with a record of a plurality of proper curves formed by plotting, for certain gain tilts, the relation between output light power of the optical amplification medium and pumping light power corresponding to the output light power, and selects, from among the plurality of proper curves, a proper curve A which is nearest to the relation in operation of the power of the pumping light which is incident to the optical amplification medium in operation and the resulting amplified output light power, thereby determining the gain tilt of the optical amplification medium based on the selected proper curve A.

2. The optical amplifier according to claim 1, wherein the amplification characteristic supervisor part, if the relation in operation exists on the proper curve A, determines the gain tilt of the proper curve A to be the gain tilt of the optical amplification medium, or otherwise if the relation in operation exists out of the proper curve A, selects a proper curve B which is next nearest to the relation in operation and sets by interpolation a proper curve C located between the proper curves A and B, thereby determining the gain tilt Corresponding to the proper curve C as the gain tilt of the optical amplification medium.

3. The optical amplifier according to claim 1, wherein the plurality of proper curves which are recorded in advance are grouped in correspondence to temperatures, and the amplification characteristic supervisor part selects the proper curve A which is nearest to the relation in operation from a first proper curve group belonging to a temperature of a group of temperatures which is most like the temperature in operation of the optical amplification medium.

4. The optical amplifier according to claim 3, wherein the amplification characteristic supervisor part, if the relation in operation exists on the proper curve A, determines the gain tilt of the proper curve A to be the gain tilt of the optical amplification medium, or otherwise if the relation in operation exists out of the proper curve A, selects a proper curve B which is next nearest to the relation in operation and sets by interpolation a proper curve C located between the proper curves A and B, thereby determining the gain tilt corresponding to the proper curve C as the gain tilt of the optical amplification medium.

5. The optical amplifier according to claim 4, wherein the amplification characteristic supervisor part, if the temperature in operation is equal to the temperature of the group of temperatures, selects the proper curves A and B from the first proper curve group belonging to the temperature of the group of temperatures and sets a proper curve C, or otherwise if the immediate temperature is unequal to the temperature of the group of temperatures, sets by interpolation a third proper curve group located between the first proper curve group and a second proper curve group belonging to an other temperature of an other group of temperatures which is next like the temperature in operation, and selects the proper curves A and B from the third proper curve group and sets the proper curve C.

6. An optical amplifier comprising:
a plurality of optical amplifier elements each being the optical amplifier of claim 1, said optical amplifier elements being connected in tandem; and
a part for compensation of gain tilt which controls gains of individual wavelengths by using the gain tilt difference between an intended gain tilt and gain tilts provided by said optical amplifier elements so that output light of the last-stage optical amplifier element has the intended gain tilt.

7. The optical amplifier according to claim 1, wherein the plurality of proper curves are represented by simple increase functions.

8. The optical amplifier according to claim 1, wherein the plurality of proper curves are represented by linear functions.

9. The optical amplifier according to claim 1, wherein the optical amplification medium comprises an erbium-doped fiber.

10. The optical amplifier according to claim 1, wherein the output light of the optical amplifier is controlled to have a prescribed power level.

11. An optical amplifier comprising:
an optical amplification medium which has simultaneous inputs of a WDM signal light and a pumping light and amplifies the signal light,
a light source which generates the pumping light,
an amplification characteristic supervisor part which evaluates a gain tilt of amplified signal lights of different wavelengths which form the WDM signal light, wherein the amplification characteristic supervisor part is provided in advance with a record of a plurality of proper curves formed by plotting, for certain gain tilts, the relation between output light power of the optical amplification medium and pumping light power corresponding to the output light power, and selects, from among the plurality of proper curves, a proper curve A which is nearest to relation in operation of the power of the pumping light which is incident to the optical amplification medium in operation and the resulting amplified output light power, thereby determining the gain tilt of the optical amplification medium based on the selected proper curve A, and
a part for compensation of gain tilt which controls gains of individual wavelengths by using a gain tilt difference between an intended gain tilt and the gain tilt evaluated by the amplification characteristic supervisor part so that output light of the optical amplifier has the intended gain tilt.

12. The optical amplifier according to claim 11, wherein the part for compensation of gain tilt separates the WDM signal light into signal lights of individual wavelengths and thereafter controls gains of the individual wavelengths.

13. The optical amplifier according to claim 11, wherein the part for compensation of gain tilt controls gains of individual wavelengths for the signal lights before multiplexing.

14. The optical amplifier according to claim 11, wherein the amplification characteristic supervisor part, if the relation in operation exists on the proper curve A, determines the gain tilt of the proper curve A to be the gain tilt of the optical amplification medium, or otherwise if the relation in operation exists out of the proper curve A, selects a proper curve B which is next nearest to the relation in operation and sets by interpolation a proper curve C located between the proper curves A and B, thereby determining the gain tilt corresponding to the proper curve C as the gain tilt of the optical amplification medium.

15. The optical amplifier according to claim 11, wherein the plurality of proper curves which are recorded in advance are grouped in correspondence to temperatures, and the amplification characteristic supervisor part selects the proper curve A which is nearest to the relation in operation from a first proper curve group belonging to a temperature of a group of temperatures which is most like the temperature in operation of the optical amplification medium.

16. The optical amplifier according to claim 15, wherein the amplification characteristic supervisor part, if the relation in operation exists on the proper curve A, determines the gain tilt of the proper curve A to be the gain tilt of the optical amplification medium, or otherwise if the relation in operation exists out of the proper curve A, selects a proper curve B which is next nearest to the relation in operation and sets by interpolation a proper curve C located between the proper curves A and B, thereby determining the gain tilt corresponding to the proper curve C as the gain tilt of the optical amplification medium.

17. The optical amplifier according to claim 16, wherein the amplification characteristic supervisor part, if the temperature in operation is equal to the temperature of the group of temperatures, selects the proper curves A and B from the first proper curve group belonging to the temperature of the group of temperatures and sets a proper curve C, or otherwise if the immediate temperature is unequal to the temperature of the group of temperatures, sets by interpolation a third proper curve group located between the first proper curve group and a second proper curve group belonging to an other temperature of an other group of temperatures which is next like the temperature in operation, and selects the proper curves A and B from the third proper curve group and sets the proper curve C.

18. A method of monitoring gain characteristics of an optical amplifier comprising the steps of: amplifying a WDM (Wavelength Division Multiplex) signal light by inputting the WDM signal light and a pumping light simultaneously into an optical amplification medium; and evaluating a gain tilt of amplified signal lights of different wavelengths which form the WDM signal light, wherein the gain tilt evaluating step includes providing in advance with a record of a plurality of proper curves formed by plotting, for certain gain tilts, the relation between output light power of the optical amplification medium and pumping light power corresponding to the output light power, and selecting, from among the plurality of proper curves, a proper curve A which is nearest to the relation in operation of the power of the pumping light which is incident to the optical amplification medium in operation and the resulting amplified output light power, thereby determining the gain tilt of the optical amplification medium based on the selected proper curve A.

* * * * *